US011900950B2

(12) United States Patent
Gao et al.

(10) Patent No.: US 11,900,950 B2
(45) Date of Patent: Feb. 13, 2024

(54) BIT ALLOCATION METHOD AND APPARATUS FOR AUDIO SIGNAL

(71) Applicant: Huawei Technologies Co., Ltd., Guangdong (CN)

(72) Inventors: Yuan Gao, Beijing (CN); Jiance Ding, Beijing (CN); Bin Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/976,474

(22) Filed: Oct. 28, 2022

(65) Prior Publication Data

US 2023/0133252 A1 May 4, 2023

Related U.S. Application Data

(63) Continuation of application No. PCT/CN2021/084578, filed on Mar. 31, 2021.

(30) Foreign Application Priority Data

Apr. 30, 2020 (CN) ......................... 202010368424.9

(51) Int. Cl.
*G10L 19/008* (2013.01)
*G10L 19/002* (2013.01)
(Continued)

(52) U.S. Cl.
CPC .......... *G10L 19/002* (2013.01); *G10L 19/008* (2013.01); *G10L 19/0212* (2013.01); *G10L 19/167* (2013.01)

(58) Field of Classification Search
CPC ..... H04H 20/89; G10L 19/008; G10L 19/167; G10L 19/0212; G10L 19/002
See application file for complete search history.

(56) References Cited

U.S. PATENT DOCUMENTS 5,583,962 A * 12/1996 Davis ...................... H04S 3/008 704/229
5,632,005 A 5/1997 Davis et al.
(Continued)

FOREIGN PATENT DOCUMENTS

CN 101217037 A 7/2008
CN 101950562 A 1/2011
(Continued)

OTHER PUBLICATIONS

N. Peters, et al., "Scene-based Audio Implemented with Higher Order Ambisonics (HOA)," 2015. (Year: 2015).*

*Primary Examiner* — Feng-Tzer Tzeng
(74) *Attorney, Agent, or Firm* — WOMBLE BOND DICKINSON (US) LLP

(57) ABSTRACT

The present disclosure provides a bit allocation method and apparatus for an audio signal. The bit allocation method for an audio signal includes: obtaining T audio signals in a current frame, where T is a positive integer; determining a first audio signal set based on the T audio signals, where the first audio signal set includes M audio signals, M is a positive integer, T≥M; determining M priorities of the M audio signals in the first audio signal set; and performing bit allocation on the M audio signals based on the M priorities of the M audio signals.

25 Claims, 5 Drawing Sheets

400

(51) Int. Cl.

| | |
|---|---|
| *G10L 19/16* | (2013.01) |
| *G10L 19/02* | (2013.01) |

(56) References Cited

U.S. PATENT DOCUMENTS

| | | | | |
|---|---|---|---|---|
| 9,412,385 | B2 * | 8/2016 | Sen | G10L 19/008 |
| 2012/0155653 | A1 * | 6/2012 | Jax | H04H 20/89 381/23 |
| 2012/0314875 | A1 | 12/2012 | Lee et al. | |
| 2014/0355768 | A1 * | 12/2014 | Sen | G10L 19/008 381/23 |
| 2014/0355771 | A1 * | 12/2014 | Peters | G10L 19/008 381/23 |
| 2015/0255076 | A1 | 9/2015 | Fejzo | |
| 2017/0365262 | A1 | 12/2017 | Miyasaka et al. | |
| 2019/0103118 | A1 | 4/2019 | Atti et al. | |

FOREIGN PATENT DOCUMENTS

| | | | |
|---|---|---|---|
| CN | 103928030 | A | 7/2014 |
| JP | 2017507365 | A | 3/2017 |
| JP | 2019505842 | A | 2/2019 |
| TW | 200915300 | A | 4/2009 |
| TW | 201907391 | A | 2/2019 |
| WO | 2015056383 | A1 | 4/2015 |

* cited by examiner

BIT ALLOCATION METHOD AND APPARATUS FOR AUDIO SIGNAL

CROSS-REFERENCE TO RELATED APPLICATIONS

This application is a continuation of International Application No. PCT/CN2021/084578, filed on Mar. 31, 2021, which claims priority to Chinese Patent Application No. 202010368424.9, filed on Apr. 30, 2020, the disclosures of which are hereby incorporated by reference in their entirety.

TECHNICAL FIELD

This application relates to audio processing technologies, and in particular, to a bit allocation method and apparatus for an audio signal.

BACKGROUND

Sound is one of main ways for human beings to obtain information. With the rapid development of high-performance computers and signal processing technologies, immersive audio technologies attract more attention. An immersive three-dimensional audio (3D audio) technology provides better three-dimensional sound experience for users by expanding audio representation to high-dimensional space. The three-dimensional audio technology does not simply perform representation by using a plurality of sound channels on a playback side. Instead, an audio signal is reconstructed in three-dimensional space, and audio is represented in the three-dimensional space by using a rendering technology.

In three-dimensional audio encoding and decoding standards in and outside China, a quantity of bits that are allocated to each audio signal and that are used for encoding and decoding cannot reflect a difference of the audio signals based on a spatial feature of the audio signals on the playback side, and cannot adapt to a feature of the audio signals. This reduces encoding and decoding efficiency of the audio signals.

SUMMARY

This application provides a bit allocation method and apparatus for an audio signal, to adapt to a feature of audio signals. In addition, different audio signals match different quantities of bits for encoding. This improves encoding and decoding efficiency of the audio signals.

According to a first aspect, this application provides a bit allocation method for an audio signal. The method includes: obtaining T audio signals in a current frame, where T is a positive integer; determining a first audio signal set based on the T audio signals, where the first audio signal set includes M audio signals, M is a positive integer, the T audio signals include the M audio signals, and T≥M; determining M priorities of the M audio signals in the first audio signal set; and performing bit allocation on the M audio signals based on the M priorities of the M audio signals.

In this application, priorities of a plurality of audio signals are determined based on a feature of the plurality of audio signals included in the current frame and related information of the audio signals in metadata, and a quantity of bits to be allocated to each audio signal is determined based on the priorities, to adapt to a feature of the audio signals. In addition, different audio signals may match different quantities of bits for encoding. This improves encoding and decoding efficiency of the audio signals.

In an embodiment, the determining M priorities of the M audio signals in the first audio signal set includes: obtaining a scene grading parameter of each of the M audio signals; and determining the M priorities of the M audio signals based on the scene grading parameter of each of the M audio signals.

In an embodiment, the obtaining a scene grading parameter of each of the M audio signals includes: obtaining one or more of a movement grading parameter, a loudness grading parameter, a spread grading parameter, a diffuseness grading parameter, a status grading parameter, a priority grading parameter, and a signal grading parameter of a first audio signal, where the first audio signal is any one of the M audio signals; and obtaining a scene grading parameter of the first audio signal based on the obtained one or more of the movement grading parameter, the loudness grading parameter, the spread grading parameter, the diffuseness grading parameter, the status grading parameter, the priority grading parameter, and the signal grading parameter, where the movement grading parameter describes a movement speed of the first audio signal in a unit time in a spatial scene, the loudness grading parameter describes loudness of the first audio signal in the spatial scene, the spread grading parameter describes a spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

A priority of the audio signal with respect to information in a plurality of dimensions may be obtained based on a plurality of parameters of an audio signal.

In an embodiment, when the obtaining T audio signals in a current frame, the method further includes: obtaining S groups of metadata in the current frame, where S is a positive integer, T≥S, the S groups of metadata correspond to the T audio signals, and the metadata describes a status of a corresponding audio signal in a spatial scene.

The metadata is used as description information of the status of the corresponding audio signal in the spatial scene, and may provide a reliable and effective basis for subsequently obtaining a scene grading parameter of the audio signal.

In an embodiment, the obtaining a scene grading parameter of each of the M audio signals includes: obtaining one or more of a movement grading parameter, a loudness grading parameter, a spread grading parameter, a diffuseness grading parameter, a status grading parameter, a priority grading parameter, and a signal grading parameter of a first audio signal based on metadata corresponding to the first audio signal or based on the first audio signal and the metadata corresponding to the first audio signal, where the first audio signal is any one of the M audio signals; and obtaining a scene grading parameter of the first audio signal based on the obtained one or more of the movement grading parameter, the loudness grading parameter, the spread grading parameter, the diffuseness grading parameter, the status grading parameter, the priority grading parameter, and the signal grading parameter, where the movement grading parameter describes a movement speed of the first audio signal in a unit time in the spatial scene, the loudness grading parameter describes loudness of the first audio signal in the spatial scene, the spread grading parameter describes a spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

With reference to a plurality of parameters of an audio signal and metadata of the audio signal, a reliable priority of the audio signal with respect to information in a plurality of dimensions may be obtained.

In an embodiment, the obtaining a scene grading parameter of the first audio signal based on the obtained one or more of the movement grading parameter, the loudness grading parameter, the spread grading parameter, the diffuseness grading parameter, the status grading parameter, the priority grading parameter, and the signal grading parameter includes: performing weighed averaging on the obtained more of the movement grading parameter, the loudness grading parameter, the spread grading parameter, the diffuseness grading parameter, the status grading parameter, the priority grading parameter, and the signal grading parameter to obtain the scene grading parameter; performing averaging on the obtained more of the movement grading parameter, the loudness grading parameter, the spread grading parameter, the diffuseness grading parameter, the status grading parameter, the priority grading parameter, and the signal grading parameter to obtain the scene grading parameter; or using, as the scene grading parameter, the obtained one of the movement grading parameter, the loudness grading parameter, the spread grading parameter, the diffuseness grading parameter, the status grading parameter, the priority grading parameter, and the signal grading parameter.

In an embodiment, the determining the M priorities of the M audio signals based on the scene grading parameter of each of the M audio signals includes: determining a priority corresponding to the scene grading parameter of the first audio signal as a priority of the first audio signal based on a specified first correspondence, where the first correspondence includes correspondences between a plurality of scene grading parameters and a plurality of priorities, one or more scene grading parameters correspond to one priority, and the first audio signal is any one of the M audio signals; using the scene grading parameter of the first audio signal as a priority of the first audio signal; or determining a range of the scene grading parameter of the first audio signal based on a plurality of specified range thresholds, and determining a priority corresponding to the range of the scene grading parameter of the first audio signal as a priority of the first audio signal.

In an embodiment, the performing bit allocation on the M audio signals based on the M priorities of the M audio signals includes: performing bit allocation based on a currently available bit quantity and the M priorities of the M audio signals, where a higher quantity of bits are allocated to an audio signal with a higher priority.

In an embodiment, the performing bit allocation based on a currently available bit quantity and the M priorities of the M audio signals includes: determining a bit quantity ratio of the first audio signal based on the priority of the first audio signal, where the first audio signal is any one of the M audio signals; and obtaining a bit quantity of the first audio signal based on a product of the currently available bit quantity and the bit quantity ratio of the first audio signal.

In an embodiment, the performing bit allocation based on a currently available bit quantity and the M priorities of the M audio signals includes: determining a bit quantity of the first audio signal from a specified second correspondence based on the priority of the first audio signal, where the second correspondence includes correspondences between a plurality of priorities and a plurality of bit quantities, one or more priorities correspond to one bit quantity, and the first audio signal is any one of the M audio signals.

In an embodiment, the determining a first audio signal set based on the T audio signals includes: adding a pre-specified audio signal of the T audio signals to the first audio signal set.

In an embodiment, the determining a first audio signal set based on the T audio signals includes: adding, to the first audio signal set, an audio signal that is in the T audio signals and that corresponds to the S groups of metadata; or adding, to the first audio signal set, an audio signal that corresponds to a priority parameter greater than or equal to a specified participation threshold, where the metadata includes the priority parameter, and the T audio signals include the audio signal that corresponds to the priority parameter.

In an embodiment, the obtaining a scene grading parameter of each of the M audio signals includes: obtaining one or more of a movement grading parameter, a loudness grading parameter, a spread grading parameter, and a diffuseness grading parameter of a first audio signal, where the first audio signal is any one of the M audio signals; obtaining a first scene grading parameter of the first audio signal based on the obtained one or more of the movement grading parameter, the loudness grading parameter, the spread grading parameter, and the diffuseness grading parameter; obtaining one or more of a status grading parameter, a priority grading parameter, and a signal grading parameter of the first audio signal; obtaining a second scene grading parameter of the first audio signal based on the obtained one or more of the status grading parameter, the priority grading parameter, and the signal grading parameter; and obtaining a scene grading parameter of the first audio signal based on the first scene grading parameter and the second scene grading parameter, where the movement grading parameter describes a movement speed of the first audio signal in a unit time in a spatial scene, the loudness grading parameter describes playback loudness of the first audio signal in the spatial scene, the spread grading parameter describes a playback spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

In an embodiment, the obtaining a scene grading parameter of each of the M audio signals includes: obtaining one or more of a movement grading parameter, a loudness grading parameter, a spread grading parameter, and a diffuseness grading parameter of a first audio signal based on metadata corresponding to the first audio signal or based on the first audio signal and the metadata corresponding to the first audio signal, where the first audio signal is any one of the M audio signals; obtaining a first scene grading parameter of the first audio signal based on the obtained one or more of the movement grading parameter, the loudness grading parameter, the spread grading parameter, and the diffuseness grading parameter; obtaining one or more of a status grading parameter, a priority grading parameter, and a signal grading parameter of the first audio signal based on the metadata corresponding to the first audio signal or based on the first audio signal and the metadata corresponding to the first audio signal; obtaining a second scene grading parameter of the first audio signal based on the obtained one or more of the status grading parameter, the priority grading parameter, and the signal grading parameter; and obtaining a scene grading parameter of the first audio signal based on the first scene grading parameter and the second scene grading parameter, where the movement grading parameter describes a movement speed of the first audio signal in a unit time in the spatial scene, the loudness grading parameter describes playback loudness of the first audio signal in the spatial scene, the spread grading parameter describes a playback spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

In this application, for different features of an audio signal, a plurality of scene grading parameters related to the audio signal are obtained by using a plurality of methods, and then a priority of the audio signal is determined based on the plurality of scene grading parameters. The priority obtained in this way may refer to the plurality of features of the audio signal, and may also be compatible with implementation solutions corresponding to the different features.

In an embodiment, the determining the M priorities of the M audio signals based on the scene grading parameter of each of the M audio signals includes: obtaining a first priority of the first audio signal based on the first scene grading parameter; obtaining a second priority of the first audio signal based on the second scene grading parameter; and obtaining the priority of the first audio signal based on the first priority and the second priority.

In this application, for different features of an audio signal, a plurality of priorities related to the audio signal are obtained by using a plurality of methods, and then compatible combination is performed on the plurality of priorities to obtain a final priority of the audio signal. The priority obtained in this way may refer to the plurality of features of the audio signal, and may also be compatible with implementation solutions corresponding to the different features.

According to a second aspect, this application provides an audio signal encoding method. After the bit allocation method for an audio signal according to any one of the implementations of the first aspect is performed, the method further includes: encoding the M audio signals based on a quantity of bits allocated to the M audio signals to obtain an encoded bitstream.

In an embodiment, the encoded bitstream includes a bit quantity of the M audio signals.

According to a third aspect, this application provides an audio signal decoding method. After the bit allocation method for an audio signal according to any one of the implementations of the first aspect is performed, the method further includes: receiving an encoding bitstream; obtaining a bit quantity of each of the M audio signals by performing the bit allocation method for an audio signal according to any one of the implementations of the first aspect; and reconstructing the M audio signals based on the bit quantity of each of the M audio signals and the encoded bitstream.

According to a fourth aspect, this application provides a bit allocation apparatus for an audio signal. The apparatus includes: a processing module, configured to: obtain T audio signals in a current frame, where T is a positive integer; determine a first audio signal set based on the T audio signals, where the first audio signal set includes M audio signals, M is a positive integer, the T audio signals include the M audio signals, and T≥M; determine M priorities of the M audio signals in the first audio signal set; and perform bit allocation on the M audio signals based on the M priorities of the M audio signals.

In an embodiment, the processing module is configured to: obtain a scene grading parameter of each of the M audio signals; and determine the M priorities of the M audio signals based on the scene grading parameter of each of the M audio signals.

In an embodiment, the processing module is configured to: obtain one or more of a movement grading parameter, a loudness grading parameter, a spread grading parameter, a diffuseness grading parameter, a status grading parameter, a priority grading parameter, and a signal grading parameter of a first audio signal, where the first audio signal is any one of the M audio signals; and obtain a scene grading parameter of the first audio signal based on the obtained one or more of the movement grading parameter, the loudness grading parameter, the spread grading parameter, the diffuseness grading parameter, the status grading parameter, the priority grading parameter, and the signal grading parameter, where the movement grading parameter describes a movement speed of the first audio signal in a unit time in a spatial scene, the loudness grading parameter describes loudness of the first audio signal in the spatial scene, the spread grading parameter describes a spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

In an embodiment, the processing module is configured to obtain S groups of metadata in the current frame, where S is a positive integer, T≥S, the S groups of metadata correspond to the T audio signals, and the metadata describes a status of a corresponding audio signal in a spatial scene.

In an embodiment, the processing module is configured to: obtain one or more of a movement grading parameter, a loudness grading parameter, a spread grading parameter, a diffuseness grading parameter, a status grading parameter, a priority grading parameter, and a signal grading parameter of a first audio signal based on metadata corresponding to the first audio signal or based on the first audio signal and the metadata corresponding to the first audio signal, where the first audio signal is any one of the M audio signals; and obtain a scene grading parameter of the first audio signal based on the obtained one or more of the movement grading parameter, the loudness grading parameter, the spread grading parameter, the diffuseness grading parameter, the status grading parameter, the priority grading parameter, and the signal grading parameter, where the movement grading parameter describes a movement speed of the first audio signal in a unit time in the spatial scene, the loudness grading parameter describes loudness of the first audio signal in the spatial scene, the spread grading parameter describes a spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

In an embodiment, the processing module is configured to: perform weighed averaging on the obtained more of the movement grading parameter, the loudness grading parameter, the spread grading parameter, the diffuseness grading parameter, the status grading parameter, the priority grading parameter, and the signal grading parameter to obtain the scene grading parameter; perform averaging on the obtained more of the movement grading parameter, the loudness grading parameter, the spread grading parameter, the diffuseness grading parameter, the status grading parameter, the priority grading parameter, and the signal grading parameter to obtain the scene grading parameter; or use, as the scene grading parameter, the obtained one of the movement grading parameter, the loudness grading parameter, the spread grading parameter, the diffuseness grading parameter, the status grading parameter, the priority grading parameter, and the signal grading parameter.

In an embodiment, the processing module is configured to: determine a priority corresponding to the scene grading parameter of the first audio signal as a priority of the first audio signal based on a specified first correspondence, where the first correspondence includes correspondences between a plurality of scene grading parameters and a plurality of priorities, one or more scene grading parameters correspond to one priority, and the first audio signal is any one of the M audio signals; use the scene grading parameter of the first audio signal as a priority of the first audio signal; or determine a range of the scene grading parameter of the first audio signal based on a plurality of specified range thresholds, and determining a priority corresponding to the range of the scene grading parameter of the first audio signal as a priority of the first audio signal.

In an embodiment, the processing module is configured to perform bit allocation based on a currently available bit quantity and the M priorities of the M audio signals, where a higher quantity of bits are allocated to an audio signal with a higher priority.

In an embodiment, the processing module is configured to: determine a bit quantity ratio of the first audio signal based on the priority of the first audio signal, where the first audio signal is any one of the M audio signals; and obtain a bit quantity of the first audio signal based on a product of the currently available bit quantity and the bit quantity ratio of the first audio signal.

In an embodiment, the processing module is configured to determine a bit quantity of the first audio signal from a specified second correspondence based on the priority of the first audio signal, where the second correspondence includes correspondences between a plurality of priorities and a plurality of bit quantities, one or more priorities correspond to one bit quantity, and the first audio signal is any one of the M audio signals.

In an embodiment, the processing module is configured to add a pre-specified audio signal of the T audio signals to the first audio signal set.

In an embodiment, the processing module is configured to: add, to the first audio signal set, an audio signal that is in the T audio signals and that corresponds to the S groups of metadata; or add, to the first audio signal set, an audio signal that corresponds to a priority parameter greater than or equal to a specified participation threshold, where the metadata includes the priority parameter, and the T audio signals include the audio signal that corresponds to the priority parameter.

In an embodiment, the processing module is configured to: obtain one or more of a movement grading parameter, a loudness grading parameter, a spread grading parameter, and a diffuseness grading parameter of a first audio signal, where the first audio signal is any one of the M audio signals; obtain a first scene grading parameter of the first audio signal based on the obtained one or more of the movement grading parameter, the loudness grading parameter, the spread grading parameter, and the diffuseness grading parameter; obtain one or more of a status grading parameter, a priority grading parameter, and a signal grading parameter of the first audio signal; obtain a second scene grading parameter of the first audio signal based on the obtained one or more of the status grading parameter, the priority grading parameter, and the signal grading parameter; and obtain a scene grading parameter of the first audio signal based on the first scene grading parameter and the second scene grading parameter, where the movement grading parameter describes a movement speed of the first audio signal in a unit time in a spatial scene, the loudness grading parameter describes playback loudness of the first audio signal in the spatial scene, the spread grading parameter describes a playback spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

In an embodiment, the processing module is configured to: obtain one or more of a movement grading parameter, a loudness grading parameter, a spread grading parameter, and a diffuseness grading parameter of a first audio signal based on metadata corresponding to the first audio signal or based on the first audio signal and the metadata corresponding to the first audio signal, where the first audio signal is any one of the M audio signals; obtain a first scene grading parameter of the first audio signal based on the obtained one or more of the movement grading parameter, the loudness grading parameter, the spread grading parameter, and the diffuseness grading parameter; obtain one or more of a status grading parameter, a priority grading parameter, and a signal grading parameter of the first audio signal based on the metadata corresponding to the first audio signal or based on the first audio signal and the metadata corresponding to the first audio signal; obtain a second scene grading parameter of the first audio signal based on the obtained one or more of the status grading parameter, the priority grading parameter, and the signal grading parameter; and obtain a scene grading parameter of the first audio signal based on the first scene grading parameter and the second scene grading parameter, where the movement grading parameter describes a movement speed of the first audio signal in a unit time in the spatial scene, the loudness grading parameter describes playback loudness of the first audio signal in the spatial scene, the spread grading parameter describes a playback spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

In an embodiment, the processing module is configured to: obtain a first priority of the first audio signal based on the first scene grading parameter; obtain a second priority of the first audio signal based on the second scene grading parameter; and obtain the priority of the first audio signal based on the first priority and the second priority.

In an embodiment, the processing module is further configured to encode the M audio signals based on a quantity of bits allocated to the M audio signals, to obtain an encoded bitstream.

In an embodiment, the encoded bitstream includes a bit quantity of the M audio signals.

In an embodiment, the apparatus further includes a transceiver module, configured to receive the encoded bitstream. The processing module is further configured to obtain a bit quantity of each of the M audio signals and reconstruct the M audio signals based on the bit quantity of each of the M audio signals and the encoded bitstream.

According to a fifth aspect, this application provides a device. The device includes: one or more processors; and a memory, configured to store one or more programs. When the one or more programs are executed by the one or more processors, the one or more processors are enabled to implement the method according to any one of the implementations of the first aspect to the third aspect.

According to a sixth aspect, this application provides a computer-readable storage medium, including a computer program. When the computer program is executed on a computer, the computer is enabled to perform the method according to any one of the implementations of the first aspect to the third aspect.

According to a seventh aspect, this application provides a computer-readable storage medium, including an encoded bitstream obtained by using the method according to the second aspect.

According to an eighth aspect, this application provides an encoding apparatus, including a processor and a communication interface. The processor reads and stores a computer program through the communication interface. The computer program includes program instructions. The processor is configured to invoke the program instructions to perform the method according to any one of the implementations of the first aspect to the third aspect.

According to a ninth aspect, this application provides an encoding apparatus, including a processor and a memory. The processor is configured to perform the method according to the second aspect. The memory is configured to store an encoded bitstream.

DESCRIPTION OF EMBODIMENTS

Figure 1A:
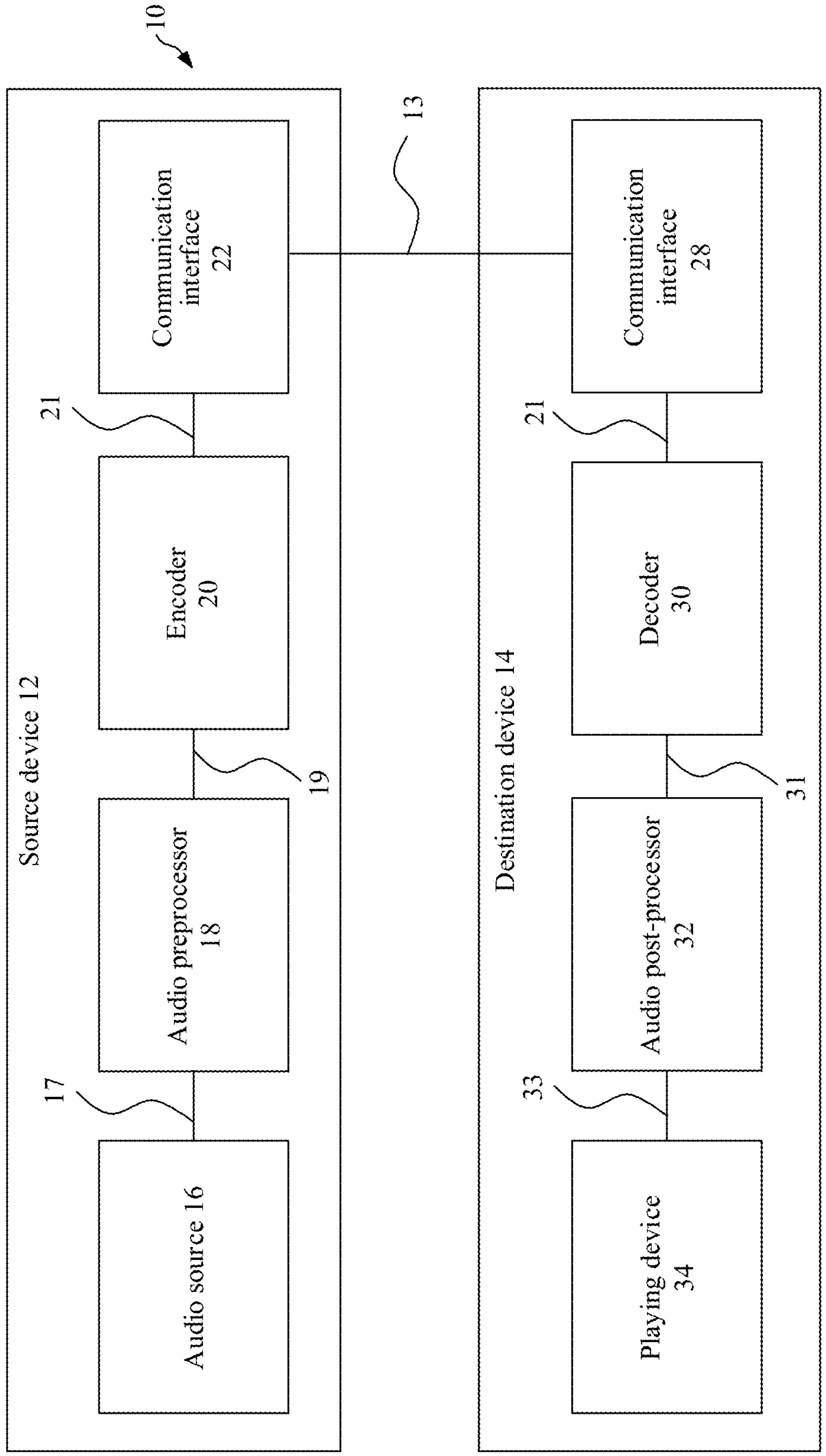
FIG. 1A is an example of a schematic block diagram of an audio encoding and decoding system according to an embodiment.

To make the objectives, technical solutions, and advantages of this application clearer, the following clearly describes the technical solutions in this application with reference to accompanying drawings in this application. Obviously, described embodiments are a part rather than all of embodiments of this application. All other embodiments obtained by a person of ordinary skill in the art based on embodiments of this application without creative efforts shall fall within the protection scope of this application.

In embodiments, claims, and accompanying drawings of the specification of this application, the terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of operations or units. Methods, systems, products, or devices are not necessarily limited to those operations or units that are literally listed, but may include other operations or units that are not literally listed or that are inherent to such processes, methods, products, or devices.

It should be understood that in this application, "at least one (item)" refers to one or more and "a plurality of" refers to two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items, including a single item (piece) or any combination of a plurality of items (pieces). For example, at least one item (piece) of a, b, or c may indicate a, b, c, a and b, a and c, b and c, or a, b, and c, where a, b, and c may be singular or plural.

Explanations of related terms in this application are as follows:

Audio frame: Audio data is in a stream form. During actual application, to facilitate audio processing and transmission, an audio data amount within one duration is usually selected as a frame of audio. The duration is referred to as "sampling time", and a value of the duration may be determined based on a requirement of a codec and a specific application. For example, the duration is 2.5 ms to 60 ms, and ms is millisecond.

Audio signal: The audio signal is a frequency and amplitude change information carrier of a regular sound wave with voice, music, and sound effect. Audio is a continuously changing analog signal, and can be represented by a continuous curve and referred to as a sound wave. A digital signal generated from the audio through analog-to-digital conversion or by using a computer is an audio signal. The sound wave has three important parameters: frequency, amplitude, and phase, which determine characteristics of the audio signal.

Metadata: Metadata is also referred to as intermediate data or relay data, is data about data (data about data), mainly describes a data property, and supports functions such as storage location indication, historical data, resource searching, and file recording. Metadata is information about organization, domain, and relationship of data. That is, metadata is data about data. In this application, the metadata describes a status of a corresponding audio signal in a spatial scene. Three-dimensional audio:

The following is a system architecture to which this application is applied.

FIG. 1A is an example of a schematic block diagram of an audio encoding and decoding system 10 according to an embodiment. As shown in FIG. 1A, the audio encoding and decoding system 10 may include a source device 12 and a destination device 14. The source device 12 generates encoded audio data, and therefore the source device 12 may be referred to as an audio encoding apparatus. The destination device 14 may decode the encoded audio data generated by the source device 12, and therefore the destination device 14 may be referred to as an audio decoding apparatus. The source device 12, the destination device 14, or various implementation solutions of the source device 12 or the destination device 14 may include one or more processors and a memory coupled to the one or more processors. The memory may include but is not limited to a random access memory (RAM), a read-only memory (ROM), a flash memory, or any other medium that may be used to store desired program code in a form of instructions or a data structure accessible by a computer. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, an audio game console, a vehicle-mounted computer, a wireless communication device, or the like.

Although FIG. 1A depicts the source device 12 and the destination device 14 as separate devices, a device embodiment may alternatively include both the source device 12 and the destination device 14 or functionalities of both the source device 12 and the destination device 14, namely, the source device 12 or a corresponding functionality and the destination device 14 or a corresponding functionality. In such embodiments, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13. The destination device 14 may receive encoded audio data from the source device 12 through the link 13. The link 13 may include one or more media or apparatuses capable of moving the encoded audio data from the source device 12 to the destination device 14. In an example, the link 13 may include one or more communication media that enable the source device 12 to directly transmit the encoded audio data to the destination device 14 in real time. In this example, the source device 12 may modulate the encoded audio data according to a communication standard (for example, a wireless communication protocol), and may transmit modulated audio data to the destination device 14. The one or more communication media may include a wireless communication medium and/or a wired communication medium, for example, a radio frequency (RF) spectrum or one or more physical transmission lines. The one or more communication media may constitute a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20. In an embodiment, the source device 12 may further include an audio source 16, an audio preprocessor 18, and a communication interface 22. In an embodiment, the encoder 20, the audio source 16, the audio preprocessor 18, and the communication interface 22 may be hardware components in the source device 12, or may be software programs in the source device 12. Descriptions are as follows.

The audio source 16 may include or may be any type of audio capture device, for example, configured to capture real-world sound, and/or any type of audio generation device, for example, a computer audio processor, or any type of device configured to obtain and/or provide real-world audio, computer animation audio (for example, screen content and audio in virtual reality (VR)), and/or any combination thereof (for example, audio in augmented reality (AR)). The audio source 16 may be a microphone for capturing audio or a memory for storing audio. The audio source 16 may further include any type of (internal or external) interface for storing previously captured or generated audio and/or obtaining or receiving audio. When the audio source 16 is a microphone, the audio source 16 may be, for example, a local audio collection apparatus or an audio collection apparatus integrated into the source device. When the audio source 16 is a memory, the audio source 16 may be, for example, a local memory or a memory integrated into the source device. When the audio source 16 includes an interface, the interface may be, for example, an external interface for receiving audio from an external audio source. The external audio source is, for example, an external audio capturing device, such as a speaker, a microphone, an external memory, or an external audio generation device. The external audio generation device is, for example, an external computer graphics processor, a computer, or a server. The interface may be any type of interface, for example, a wired or wireless interface or an optical interface, according to any proprietary or standardized interface protocol.

Audio may be considered as a one-dimensional vector of a pixel (picture element). A pixel in the vector may also be referred to as a sample. A quantity of samples on the vector or audio defines a size of the audio. In this application, audio transmitted by the audio source 16 to an audio processor may also be referred to as original audio data 17.

The audio preprocessor 18 is configured to receive the original audio data 17 and perform preprocessing on the original audio data 17 to obtain preprocessed audio 19 or preprocessed audio data 19. For example, the preprocessing performed by the audio preprocessor 18 may include trimming, tuning, or denoising.

The encoder 20 (or referred to as an audio encoder 20) is configured to receive the preprocessed audio data 19, and process the preprocessed audio data 19 to provide encoded audio data 21. In some embodiments, the encoder 20 may be configured to perform various embodiments described below, to implement application of the bit allocation method for an audio signal described in this application to an encoder side.

The communication interface 22 may be configured to receive the encoded audio data 21, and transmit the encoded audio data 21 to the destination device 14 or any other device (for example, a memory) through the link 13 for storage or direct reconstruction. The any other device may be any device for decoding or storage. The communication interface 22 may be, for example, configured to encapsulate the encoded audio data 21 into an appropriate format, for example, a data packet, for transmission through the link 13.

The destination device 14 includes a decoder 30. In an embodiment, the destination device 14 may further include a communication interface 28, an audio post-processor 32, and a playing device 34. Descriptions are as follows.

The communication interface 28 may be configured to receive the encoded audio data 21 from the source device 12 or any other source. The any other source is, for example, a storage device. The storage device is, for example, an encoded audio data storage device. The communication interface 28 may be configured to transmit or receive the encoded audio data 21 through the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communication interface 28 may be, for example, configured to decapsulate the data packet transmitted through the communication interface 22, to obtain the encoded audio data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded audio data transmission.

The decoder 30 (or referred to as an audio decoder 30) is configured to receive the encoded audio data 21, and provide decoded audio data 31 or decoded audio 31. In some embodiments, the decoder 30 may be configured to perform various embodiments described below, to implement application of the bit allocation method for an audio signal described in this application to a decoder side.

The audio post-processor 32 is configured to perform post-processing on the decoded audio data 31 (also referred to as reconstructed audio data) to obtain post-processed audio data 33. The post-processing performed by the audio post-processor 32 may include trimming or resampling, or any other processing, and may be further configured to transmit the post-processed audio data 33 to the playing device 34.

The playing device 34 is configured to receive the post-processed audio data 33 to play audio to, for example, a user or a listener. The playing device 34 may be or may include any type of player configured to present reconstructed audio, for example, an integrated or external speaker or speaker.

Although FIG. 1A depicts the source device 12 and the destination device 14 as separate devices, a device embodiment may alternatively include both the source device 12 and the destination device 14 or functionalities of both the source device 12 and the destination device 14, namely, the source device 12 or a corresponding functionality and the destination device 14 or a corresponding functionality. In such embodiments, the source device 12 or the corresponding functionality and the destination device 14 or the corresponding functionality may be implemented by using same hardware and/or software, separate hardware and/or software, or any combination thereof.

A person skilled in the art clearly knows, based on the description, that existence and (accurate) division of functionalities of different units or the functionalities of the source device 12 and/or the destination device 14 shown in FIG. 1A may vary with an actual device and application. The source device 12 and the destination device 14 may be any one of a wide range of devices, including any type of handheld or stationary device, for example, a notebook or laptop computer, a mobile phone, a smartphone, a pad or a tablet computer, a video camera, a desktop computer, a set-top box, a television set, a camera, a vehicle-mounted device, a playing device, a digital media player, a game console, a media streaming transmission device (such as a content service server or a content distribution server), a broadcast receiver device, or a broadcast transmitter device, and may not use or may use any type of operating system.

The encoder 20 and the decoder 30 each may be implemented as any one of various appropriate circuits, for example, one or more microprocessors, digital signal processors (digital signal processors, DSPs), application-specific integrated circuits (application-specific integrated circuits, ASICs), field programmable gate arrays (field programmable gate arrays, FPGAs), discrete logic, hardware, or any combinations thereof. If the technologies are implemented partially by using software, a device may store software instructions in an appropriate and non-transitory computer-readable storage medium and may execute instructions by using hardware such as one or more processors, to perform the technologies of this disclosure. Any of the foregoing content (including hardware, software, a combination of hardware and software, and the like) may be considered as one or more processors.

In some cases, the audio encoding and decoding system 10 shown in FIG. 1A is merely an example and the technologies of this application may be applied to audio coding settings (for example, audio encoding or audio decoding) that do not necessarily include any data communication between an encoding device and a decoding device. In another example, data may be retrieved from a local memory, transmitted in a streaming manner through a network, or the like. An audio encoding device may encode data and store data into the memory, and/or an audio decoding device may retrieve and decode data from the memory. In some examples, the encoding and the decoding are performed by devices that do not communicate with one another, but simply encode data to the memory and/or retrieve and decode data from the memory.

Figure 1B:
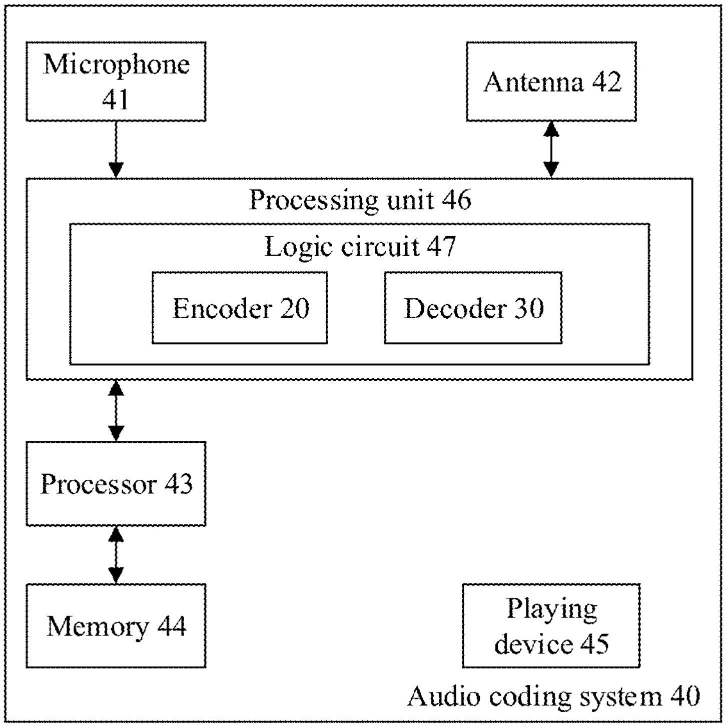
FIG. 1B is an illustrative diagram of an example of an audio coding system according to an embodiment.

FIG. 1B is an illustrative diagram of an example of an audio coding system 40 according to an example embodiment. The audio coding system 40 can implement a combination of various technologies in embodiments of this application. In the illustrated implementation, the audio coding system 40 may include a microphone 41, the encoder 20, the decoder 30 (and/or an audio encoder/decoder implemented by using a logic circuit 47 of a processing unit 46), an antenna 42, one or more processors 43, one or more memories 44, and/or a playing device 45.

As shown in FIG. 1B, the microphone 41, the antenna 42, the processing unit 46, the logic circuit 47, the encoder 20, the decoder 30, the processor 43, the memory 44, and/or the playing device 45 can communicate with each other. As described, although the audio coding system 40 is illustrated with the encoder 20 and the decoder 30, the audio coding system 40 may include only the encoder 20 or only the decoder 30 in different examples.

In some examples, the antenna 42 may be configured to transmit or receive an encoded bitstream of audio data. In addition, in some examples, the playing device 45 may be configured to play audio data. In some examples, the logic circuit 47 may be implemented by using the processing unit 46. The processing unit 46 may include application-specific integrated circuit (application-specific integrated circuit, ASIC) logic, a graphics processing unit, a general-purpose processor, or the like. The audio coding system 40 may also include the optional processor 43. The optional processor 43 may similarly include application-specific integrated circuit (ASIC) logic, a graphics processing unit, or the like. In some examples, the logic circuit 47 may be implemented by using hardware, for example, audio coding dedicated hardware. The processor 43 may be implemented by using general-purpose software, an operating system, or the like. In addition, the memory 44 may be any type of memory, for example, a volatile memory (for example, a static random access memory (SRAM) or a dynamic random access memory (DRAM)) or a non-volatile memory (for example, a flash memory). In a non-limitative example, the memory 44 may be implemented by using a cache memory. In some examples, the logic circuit 47 may access the memory 44. In other examples, the logic circuit 47 and/or the processing unit 46 may include a memory (for example, a cache) for implementation of a buffer or the like.

In some examples, the encoder 20 implemented by using the logic circuit may include a buffer (for example, implemented by using the processing unit 46 or the memory 44) and an audio processing unit (for example, implemented by using the processing unit 46). The audio processing unit may be communicatively coupled to the buffer. The audio processing unit may include the encoder 20 implemented by using the logic circuit 47, to implement various modules of any other encoder system or subsystem described in this specification. The logic circuit may be configured to perform various operations described in this specification.

In some examples, the decoder 30 may be implemented by using the logic circuit 47 in a similar manner, to implement various modules of any other decoder system or subsystem described in this specification. In some examples, the decoder 30 implemented by using the logic circuit may include a buffer (implemented by using the processing unit 46 or the memory 44) and an audio processing unit (for example, implemented by using the processing unit 46). The audio processing unit may be communicatively coupled to the buffer. The audio processing unit may include the decoder 30 implemented by using the logic circuit 47, to implement various modules of any other decoder system or subsystem described in this specification.

In some examples, the antenna 42 may be configured to receive an encoded bitstream of audio data. As discussed, the encoded bitstream may include audio signal data, metadata, and the like that are related to an audio frame and that are described in this specification. The audio coding system 40 may further include the decoder 30 that is coupled to the antenna 42 and that is configured to decode the encoded bitstream. The playing device 45 is configured to play an audio frame.

It should be understood that, in this application, for the example described with reference to the encoder 20, the decoder 30 may be configured to perform an inverse process. With regard to metadata, the decoder 30 may be configured to receive and parse such metadata, and correspondingly decode related audio data. In some examples, the encoder 20 may entropy encode the metadata into an encoded audio bitstream. In such examples, the decoder 30 may parse such metadata and correspondingly decode related audio data.

Figure 2:
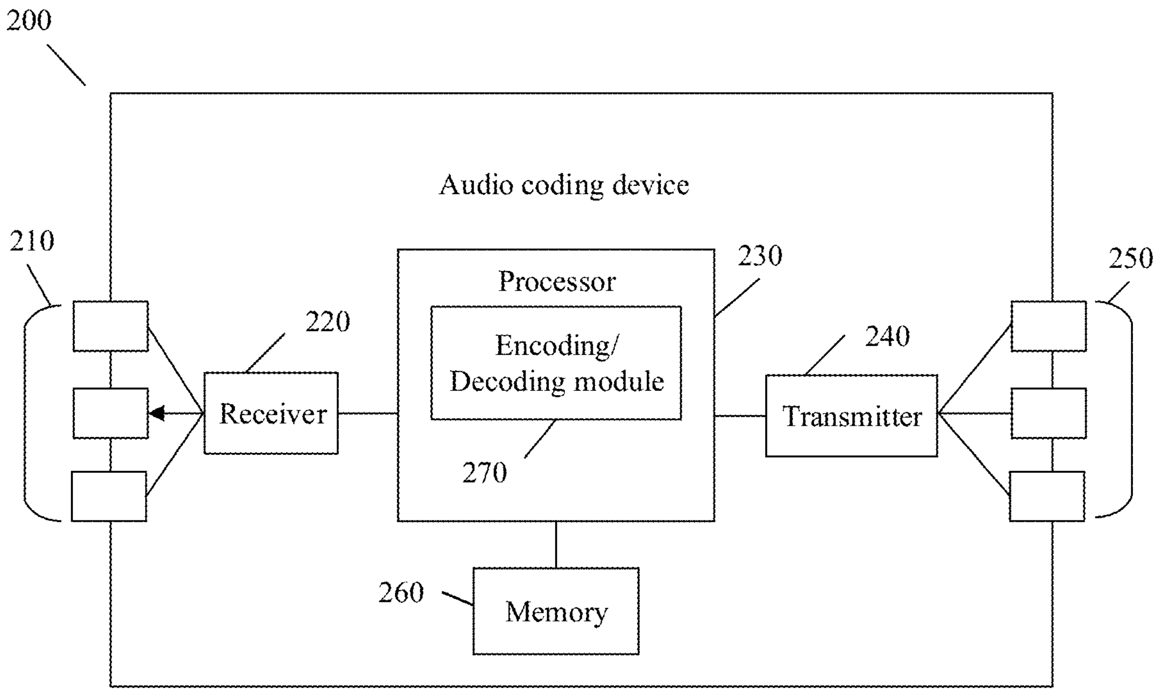
FIG. 2 is a schematic diagram of a structure of an audio coding device according to an embodiment.

FIG. 2 is a schematic diagram of a structure of an audio coding device 200 (for example, an audio encoding device or an audio decoding device) according to an embodiment. The audio coding device 200 is suitable for implementing embodiments described in this application. In an embodiment, the audio coding device 200 may be an audio decoder (for example, the decoder 30 in FIG. 1A) or an audio encoder (for example, the encoder 20 in FIG. 1A). In another embodiment, the audio coding device 200 may be one or more components of the decoder 30 in FIG. 1A or the encoder 20 in FIG. 1A.

The audio coding device 200 includes an ingress port 210 and a receiver unit (Rx) 220 for receiving data, a processor, a logic unit, or a central processing unit (CPU) 230 for processing the data, a transmitter unit (Tx) 240 and an egress port 250 for transmitting the data, and a memory 260 for storing the data. The audio coding device 200 may further include optical-to-electrical conversion components and electrical-to-optical (EO) components coupled to the ingress port 210, the receiver unit 220, the transmitter unit 240, and the egress port 250 for egress or ingress of optical or electrical signals.

The processor 230 is implemented by using hardware and software. The processor 230 may be implemented as one or more CPU chips, cores (for example, a multi-core processor), FPGAs, ASICs, and DSPs. The processor 230 is in communication with the ingress port 210, the receiver unit 220, the transmitter unit 240, the egress port 250, and the memory 260. The processor 230 includes a coding module 270 (for example, an encoding module 270 or a decoding module 270). The encoding/decoding module 270 implements embodiments disclosed in this specification, to implement the bit allocation method for an audio signal provided in this application. For example, the encoding/decoding module 270 implements, processes, or provides various coding operations. Therefore, the encoding/decoding module 270 provides a substantial improvement to functions of the audio coding device 200 and affects a switching of the audio coding device 200 to a different state. Alternatively, the encoding/decoding module 270 is implemented as instructions stored in the memory 260 and executed by the processor 230.

The memory 260 includes one or more disks, tape drives, and solid-state drives and may be used as an over-flow data storage device to store programs when such programs are selectively executed, and to store instructions and data that are read during program execution. The memory 260 may be volatile and/or non-volatile, and may be a read-only memory (ROM), a random access memory (RAM), a ternary content-addressable memory (TCAM), and/or a static random access memory (SRAM).

Figure 3:
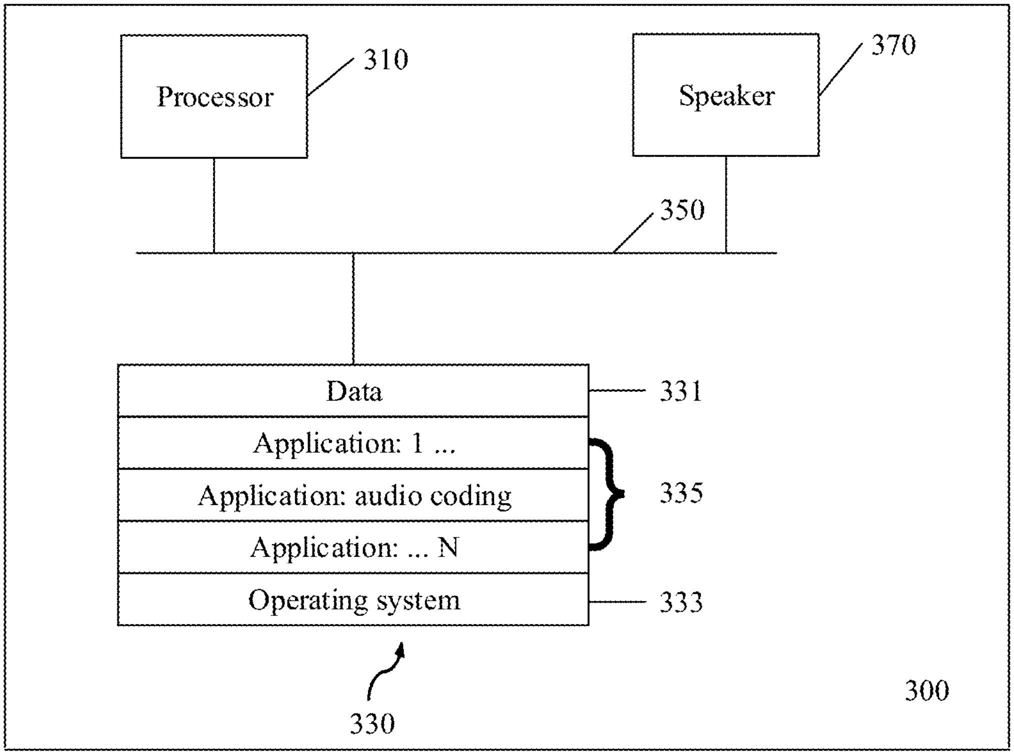
FIG. 3 is a simplified block diagram of an apparatus according to an embodiment.

FIG. 3 is a simplified block diagram of an apparatus 300 according to an embodiment. The apparatus 300 can implement technologies of this application. In other words, FIG. 3 is a schematic block diagram of an implementation of an encoding device or a decoding device (briefly referred to as a coding device 300) according to this application. The apparatus 300 may include a processor 310, a memory 330, and a bus system 350. The processor and the memory are connected through the bus system. The memory is configured to store instructions. The processor is configured to execute the instructions stored in the memory. The memory of the coding device stores program code. The processor may invoke the program code stored in the memory to perform the method described in this application. To avoid repetition, details are not described herein again.

In this application, the processor 310 may be a central processing unit (CPU), or the processor 310 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

The memory 330 may include a read-only memory (ROM) device or a random access memory (RAM) device. Any other proper type of storage device may also be used as the memory 330. The memory 330 may include code and data 331 that are accessed by the processor 310 through the bus 350. The memory 330 may further include an operating system 333 and an application 335.

In addition to a data bus, the bus system 350 may further include a power bus, a control bus, a status signal bus, and the like. However, for clear description, various types of buses in the figure are marked as the bus system 350.

In an embodiment, the coding device 300 may further include one or more output devices, for example, a speaker 370. In an example, the speaker 370 may be a headset or a loudspeaker. The speaker 370 may be connected to the processor 310 through the bus 350.

Figure 4:
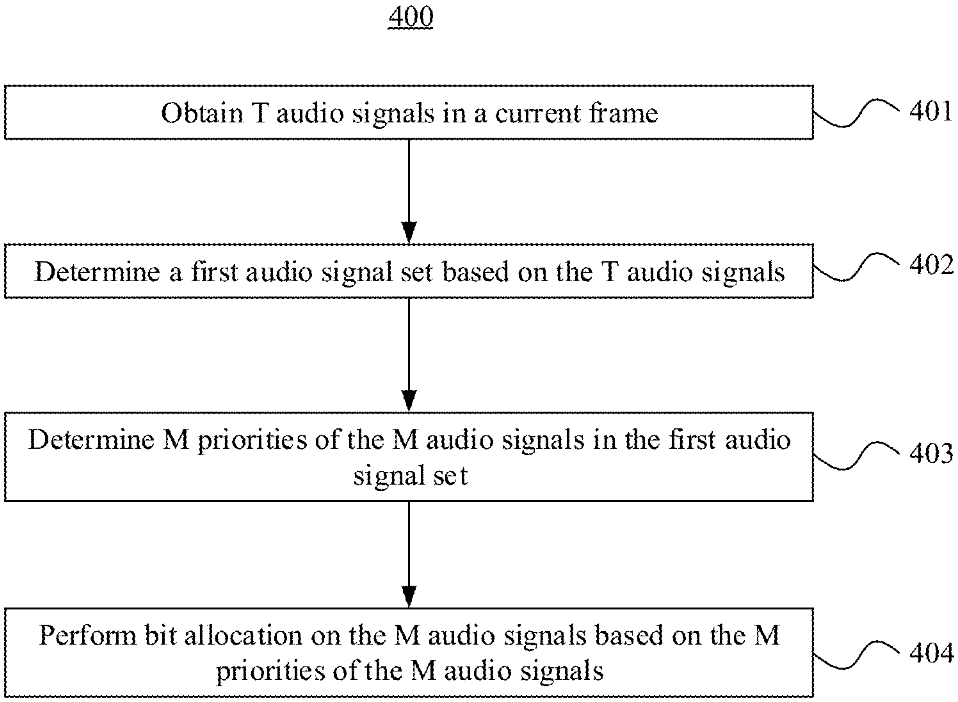
FIG. 4 is a schematic flowchart of a bit allocation method for an audio signal according to an embodiment.

Based on the descriptions of the foregoing embodiments, this application provides a bit allocation method for an audio signal. FIG. 4 is a schematic flowchart of a bit allocation method for an audio signal according to an embodiment. A process 400 may be executed by the source device 12 or the destination device 14. The process 400 is described as a series of steps or operations. It should be understood that steps or operations of the process 400 may be performed in various sequences and/or simultaneously, not limited to an execution sequence shown in FIG. 4. As shown in FIG. 4, the method includes the following operations.

Operation 401: Obtain T audio signals in a current frame.

T is a positive integer. The current frame is an audio frame obtained at a current moment in a process of performing the method in this application. To create immersive stereo sound effect, in a three-dimensional audio technology, different sounds are no longer simply represented by using a plurality of channels, but are represented by using different audio signals. For example, an environment includes a human sound, a music sound, and a vehicle sound, and three audio signals are separately used to represent the human sound, the music sound, and the vehicle sound. Then, each sound is reconstructed in three-dimensional space based on the three audio signals, to represent a plurality of sounds in the three-dimensional space. In other words, the audio frame may include a plurality of audio signals, and one audio signal represents voice, music, or sound effect in reality. It should be noted that any technology for extracting an audio signal from an audio frame may be used in this application. This is not specifically limited.

In an embodiment, S groups of metadata in the current frame are obtained, where the S groups of metadata correspond to the T audio signals. For example, each of the T audio signals corresponds to one group of metadata. In this case, S=T. For another example, only some of the T audio signals correspond to the metadata. In this case, T>S. This is not specifically limited.

In this application, audio data and metadata are separately generated in this process on an encoder side based on preprocessing of an original voice, music, sound effect, or the like. The encoder side may select, based on a principle of an audio frame and corresponding to a start time (sample) and an end time (sample) of the current frame, metadata in a corresponding time range as metadata of the current frame. A decoder side may parse a received bitstream to obtain the metadata of the current frame.

In this application, the metadata describes a status of an audio signal in a spatial scene. For example, Table 1 describes an example of the metadata. Parameters included in the metadata include an object index (object_index), an azimuth (position_azimuth), an elevation (position_elevation), a position radius (position_radius), a gain factor (gain_factor), a uniform spread degree (spread_uniform), a spread width (spread_width), a spread height (spread_height), a spread depth (spread_depth), diffuseness (diffuseness), a priority (priority), divergence (divergence), and a speed (speed). The metadata records a value range and a quantity of bits of the foregoing parameters. It should be noted that the metadata may further include another parameter and a parameter recording form. This is not specifically limited in this application.

TABLE 1

| Metadata | Value range (Precision) | Quantity of bits |
|---|---|---|
| object_index | 1; 128 (1) | 7 |
| position_azimuth | −180; 180 (2) | 8 |
| position_elevation | −90; 90 (5) | 6 |
| position_radius | 0.5; 16 (non-linear) | 4 |
| gain_factor | 0.004; 5.957 (non-linear) | 7 |
| spread_uniform | 0; 180 | 7 |
| spread_width | 0; 180 | 7 |
| spread_height | 0; 90 | 5 |
| spread_depth | 0; 15.5 | 4 |
| diffuseness | 0; 1 | 7 |
| priority | 0; 7 | 3 |
| divergence | 0; 1 | 8 |
| speed | 0, 1 | 4 |

Operation 402: Determine a first audio signal set based on the T audio signals.

The first audio signal set includes M audio signals, where M is a positive integer, T audio signals include the M audio signals, and T≥M. In this application, an audio signal that is in the T audio signals and that corresponds to metadata may be added to the first audio signal set. In other words, if all the foregoing T audio signals correspond to metadata, all the T audio signals may be added to the first audio signal set. If only some of the foregoing T audio signals correspond to metadata, only these audio signals need to be added to the first audio signal set. In this application, a pre-specified audio signal in the T audio signals may be further added to the first audio signal set. Some or all of the T audio signals may be added to the first audio signal set through high-layer signaling or in a manner specified by a user. In an embodiment, an index of the audio signal to be added to the first audio signal set is directly configured through the high-layer signaling. Alternatively, the user specifies voice, music, or sound effect, and adds an audio signal of a specified object to the first audio signal set. In this application, reference may be further made to a priority parameter of an audio signal recorded in metadata. The priority parameter indicates importance of a corresponding audio signal in three-dimensional audio. When the priority parameter is greater than or equal to a specified participation threshold, the audio signal that is in the T audio signals and that corresponds to the priority parameter is added to the first audio signal set.

It should be noted that the foregoing provides several methods for classifying the T audio signals in the current frame (namely, adding all or some of the T audio signals to the first audio signal set). It should be understood that the methods cannot constitute all limitations in this application. Other methods, including another designation manner that refers to high-layer signaling, another parameter in metadata, and the like, may be further used in this application.

Operation 403: Determine M priorities of the M audio signals in the first audio signal set.

In this application, a scene grading parameter of each of the M audio signals may be first obtained, and then the M priorities of the M audio signals is determined based on the scene grading parameter of each of the M audio signals.

The scene grading parameter may be an importance indicator that is of the audio signal and that is obtained based on a related parameter of the audio signal. The related parameter may include one or more of a movement grading parameter, a loudness grading parameter, a spread grading parameter, a diffuseness grading parameter, a status grading parameter, a priority grading parameter, and a signal grading parameter. These parameters may be obtained based on a signal feature of the audio signal, or may be obtained based on metadata of the audio signal. The movement grading parameter describes a movement speed of a first audio signal in a unit time in the spatial scene. The loudness grading parameter describes playback loudness of the first audio signal in the spatial scene. The spread grading parameter describes a playback spread range of the first audio signal in the spatial scene. The diffuseness grading parameter describes a diffuseness range of the first audio signal in the spatial scene. The status grading parameter describes sound source divergence of the first audio signal in the spatial scene. The priority grading parameter describes a priority of the first audio signal in the spatial scene. The signal grading parameter describes energy of the first audio signal in an encoding process.

The following uses an $i^{th}$ audio signal as an example to describe a method for obtaining the foregoing parameters. The $i^{th}$ audio signal is any one of the M audio signals. It should be noted that the following several parameters are examples for description, and the scene grading parameter may alternatively be calculated based on another parameter or feature of the audio signal. This is not specifically limited in this application.

(1) Movement Grading Parameter

The movement grading parameter may be calculated according to the following equation:

$$speedRatio_i = \frac{f(d_i)}{\sum_{j=1}^{M} f(d_j)}$$

Herein, $speedRatio_i$ indicates a movement grading parameter of the $i^{th}$ audio signal. f $(d_i)$ indicates a mapping relationship between a movement status of the $i^{th}$ audio signal in the spatial scene and metadata. $d_i$ indicates a movement distance of the $i^{th}$ audio signal in a unit time.

$$d_i = \sqrt{r_0^2 + r_i^2 - 2 \times r_0 \times r_i \times [(\sin\theta_0 \sin\theta_i \cos(\varphi_0 - \varphi_i) + \cos\theta_0 \cos\theta_i)]}.$$

Figure 5:
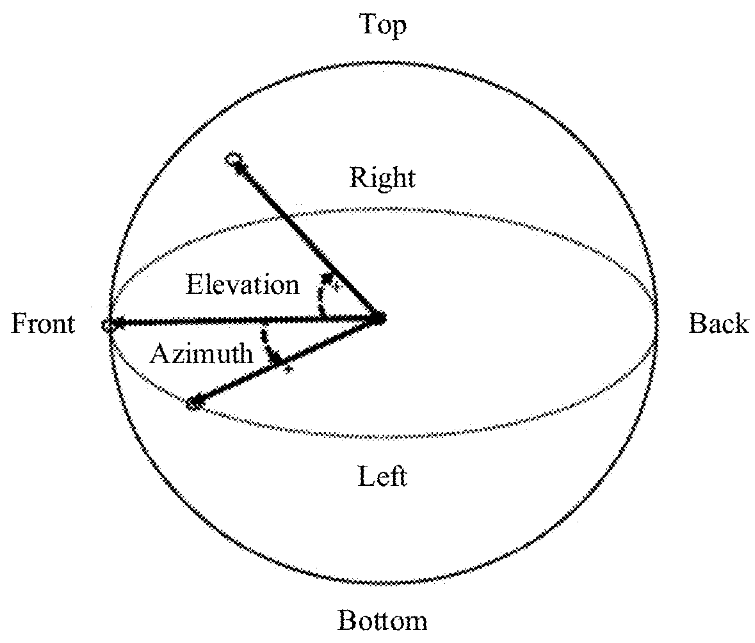
FIG. 5 is an example of a schematic diagram of a location of an audio signal in a spatial scene.

$\theta_i$ indicates an azimuth of the $i^{th}$ audio signal relative to a rendering center point after the $i^{th}$ audio signal is moved. $\varphi_i$ indicates an elevation of the $i^{th}$ audio signal relative to the rendering center point after the $i^{th}$ audio signal is moved. $r_i$ indicates a distance of the $i^{th}$ audio signal relative to the rendering center point after the $i^{th}$ audio signal is moved. $\theta_0$ indicates an azimuth of the $i^{th}$ audio signal relative to the rendering center point before the $i^{th}$ audio signal is moved. $\varphi_0$, indicates an elevation of the $i^{th}$ audio signal relative to the rendering center point before the $i^{th}$ audio signal is moved. $r_0$ indicates a distance of the $i^{th}$ audio signal relative to the rendering center point before the $i^{th}$ audio signal is moved. As shown in FIG. 5, it is assumed that spherical coordinates indicate a location of three-dimensional audio in the spatial scene, a sphere center is used as the rendering center point, a sphere radius is a distance between a location of the $i^{th}$ audio signal in the spatial scene and the sphere center, an included angle between the location of the $i^{th}$ audio signal in the spatial scene and a horizontal plane is the elevation of the $i^{th}$ audio signal, an included angle between a projection of the location of the $i^{th}$ audio signal in the spatial scene on the horizontal plane and a front of the rendering center point is the azimuth of the $i^{th}$ audio signal, and $$\sum_{j=1}^{M} f(d_j)$$

indicates a sum of mapping relationships between movement statuses of the M audio signals in the spatial scene and the metadata.

Alternatively, the movement grading parameter may be calculated according to the following equation:

$$speedRatio_i = \frac{d_i}{\sum_{j=1}^{M} d_j}$$

Herein, $$\sum_{j=1}^{M} d_j$$

indicates a sum of movement distances of the M audio signals in a unit time.

It should be noted that the movement grading parameter may alternatively be calculated by using another method. This is not specifically limited in this application.

(2) Loudness Grading Parameter

The loudness grading parameter may be calculated according to the following equation:

$$loudRatio_i = \frac{f(A_i, \text{gain}_i, r_i)}{\sum_{j=1}^{M} f(A_j, \text{gain}_j, r_j)}$$

Herein, $loudRatio_i$ indicates a loudness grading parameter of the $i^{th}$ audio signal. $f(A_i, \text{gain}_i, r_i)$ indicates a mapping relationship between playback loudness of the $i^{th}$ audio signal in the spatial scene and both of a signal feature and the metadata. $A_i$ indicates a sum or an average value of amplitudes of samples of the $i^{th}$ audio signal in the current frame. The amplitudes of the samples may be obtained based on metadata of the $i^{th}$ audio signal. $gain_i$ indicates a gain value of the audio signal in the current frame, and may be obtained based on the metadata of the $i^{th}$ audio signal. $r_i$ indicates a distance from the $i^{th}$ audio signal to the rendering center point in the current frame, and may be obtained based on the metadata of the $i^{th}$ audio signal.

$$\sum_{j=1}^{M} f(A_j, \mathrm{gain}_j, r_j)$$

indicates a sum of mapping relationships between playback loudness of the M audio signals in the spatial scene and both of the signal feature and the metadata.

Alternatively, the loudness grading parameter may be calculated according to the following equation:

$$loudRatio_i = \frac{\mathrm{mean}(A_i)}{\sum_{j=1}^{M} \mathrm{mean}(A_j)}$$

Herein, mean (A) indicates a sum or an average value of amplitudes of samples of the $i^{th}$ audio signal in the current frame. The amplitudes of the samples may be obtained based on metadata of the $i^{th}$ audio signal.

$$\sum_{j=1}^{M} \mathrm{mean}(A_j)$$

indicates a sum or an average value of amplitudes of samples of the M audio signals in the current frame.

Alternatively, the loudness grading parameter may be calculated according to the following equation:

$$loudRatio_i = \frac{1/r_i}{\sum_{j=1}^{M} 1/r_j}$$

Herein, $r_i$ indicates a distance between the $i^{th}$ audio signal and the rendering center point, and may be obtained based on metadata of the $i^{th}$ audio signal.

$$\sum_{j=1}^{M} 1/r_j$$

indicates a sum of reciprocals of distances between the M audio signals and the rendering center point.

Alternatively, the loudness grading parameter may be calculated according to the following equation:

$$loudRatio_i = \frac{\mathrm{gain}_i}{\sum_{j=1}^{M} \mathrm{gain}_j}$$

Herein, $gain_i$ indicates a gain of the $i^{th}$ audio signal in rendering. The gain may be obtained by a user by customizing the $i^{th}$ audio signal, or may be generated by a decoder according to a specified rule.

$$\sum_{j=1}^{M} \mathrm{gain}_j$$

indicates a sum of gains of the M audio signals in rendering.

It should be noted that the loudness grading parameter may alternatively be calculated by using another method. This is not specifically limited in this application.

(3) Spread Grading Parameter

The spread grading parameter describes a spread degree of the $i^{th}$ audio signal in the current frame, and may be obtained based on spread-related metadata of the $i^{th}$ audio signal. It should be noted that the spread grading parameter may alternatively be calculated by using another method. This is not specifically limited in this application.

(4) Diffuseness Grading Parameter

The diffuseness grading parameter describes diffuseness of the $i^{th}$ audio signal in the current frame, and may be obtained based on diffuseness-related metadata of the $i^{th}$ audio signal. It should be noted that the diffuseness grading parameter may alternatively be calculated by using another method. This is not specifically limited in this application.

(5) Status Grading Parameter

The status grading parameter describes divergence of the $i^{th}$ audio signal in the current frame, and may be obtained based on divergence-related metadata of the $i^{th}$ audio signal. It should be noted that the status grading parameter may alternatively be calculated by using another method. This is not specifically limited in this application.

(6) Priority Grading Parameter

The priority grading parameter describes a priority of the $i^{th}$ audio signal in the current frame, and may be obtained based on priority-related metadata of the $i^{th}$ audio signal. It should be noted that the priority grading parameter may alternatively be calculated by using another method. This is not specifically limited in this application.

(7) Signal Grading Parameter

The signal grading parameter describes energy of the $i^{th}$ audio signal in an encoding process of the current frame, and may be obtained based on original energy of the $i^{th}$ audio signal, or may be obtained based on signal energy that is obtained after the $i^{th}$ audio signal is preprocessed. It should be noted that the signal grading parameter may alternatively be calculated by using another method. This is not specifically limited in this application.

After the foregoing one or more of the parameters of the $i^{th}$ audio signal are obtained, a scene grading parameter $sceneRatio_i$ of the $i^{th}$ audio signal may be calculated based on the one or more of the parameters. In other words, the scene grading parameter $sceneRatio_i$ of the $i^{th}$ audio signal may be a function about the one or more of the parameters, and may be expressed as:

$$sceneRatio_i = f(speedRatio_i, loudRatio_i \ldots)$$

The function may be linear or non-linear. This is not specifically limited in this application.

In an embodiment, weighted averaging may be performed on the foregoing one or more of the parameters of the $i^{th}$ audio signal, for example, the plurality of the movement grading parameter, the loudness grading parameter, the spread grading parameter, the diffuseness grading parameter, the status grading parameter, the priority grading parameter, and the signal grading parameter, to obtain the scene grading parameter of the $i^{th}$ audio signal, that is, $$\begin{aligned} sceneRatio_i &= f(speedRatio_i, loudRatio_i, \ldots) \\ &= \alpha 1 \times speedRatio_i + \alpha 2 \times loudRatio_i + \ldots \end{aligned}$$

Herein, α1-α4 are separately weight factors of corresponding parameters. A value of the weight factor may be any value from 0 to 1, inclusive. A sum of the weight factors is 1. A larger value of the weight factor indicates higher importance and a higher ratio of the corresponding parameter during calculation of the scene grading parameter. If the value is 0, it indicates that the corresponding parameter does not participate in the calculation of the scene grading parameter. In other words, a feature of an audio signal that corresponds to the parameter is not considered during the calculation of the scene grading parameter. If the value is 1, it indicates that only the corresponding parameter is considered during the calculation of the scene grading parameter. In other words, a feature of an audio signal that corresponds to the parameter is a unique basis for the calculation of the scene grading parameter. The value of the weight factor may be preset, or may be obtained through adaptive calculation in an execution process of the method in this application. This is not specifically limited in this application. In an embodiment, if only one of the foregoing one or more of the parameters of the $i^{th}$ audio signal is obtained, the parameter is used as the scene grading parameter of the $i^{th}$ audio signal.

In an embodiment, averaging may be performed on the foregoing one or more of the parameters of the $i^{th}$ audio signal, for example, the plurality of the movement grading parameter, the loudness grading parameter, the spread grading parameter, the diffuseness grading parameter, the status grading parameter, the priority grading parameter, and the signal grading parameter, to obtain the scene grading parameter of the $i^{th}$ audio signal, that is, $$\begin{aligned} sceneRatio_i &= f(spRatio_i, lnRatio_i, gainRatio_i, disRatio_i) \\ &= \frac{1}{4}(spRatio_i + lnRatio_i + gainRatio_i + disRatio_i) \end{aligned}$$

It should be noted that, in the foregoing function, the scene grading parameter of the $i^{th}$ audio signal is calculated. The foregoing provides two function implementation methods for calculating the scene grading parameter of the $i^{th}$ audio signal. Another calculation method may alternatively be used in this application. This is not specifically limited.

Figure 6:
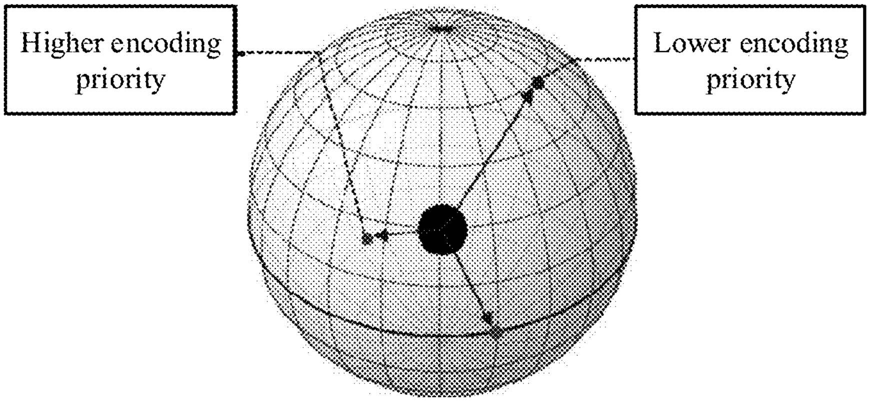
FIG. 6 is an example of a schematic diagram of a priority of an audio signal in a spatial scene.

In this application, based on the scene grading parameter of the $i^{th}$ audio signal, a priority of the $i^{th}$ audio signal may be obtained by using the following method. There is a linear relationship between the scene grading parameter and the priority of the $i^{th}$ audio signal. In other words, a larger scene grading parameter indicates a higher priority. As shown in FIG. 6, a spatial scene uses a rendering center as a sphere center. An audio signal closer to the sphere center has a higher priority. An audio signal farther from the sphere center has a lower priority.

In an embodiment, a priority corresponding to the scene grading parameter of the $i^{th}$ audio signal may be determined as the priority of the $i^{th}$ audio signal based on a specified first correspondence. The first correspondence includes correspondences between a plurality of scene grading parameters and a plurality of priorities. One or more scene grading parameters correspond to one priority.

Based on historical data and/or experience accumulation of audio signal encoding, a priority of an audio signal and a correspondence between a scene grading parameter and each priority may be preset. For example, Table 2 describes an example of the first correspondence between the scene grading parameters and the priorities.

TABLE 2

| Scene grading parameter | Priority |
|---|---|
| 0.9 | 1 |
| 0.8 | 2 |
| 0.7 | 3 |
| 0.6 | 4 |
| 0.5 | 5 |
| 0.4 | 6 |
| 0.3 | 7 |
| 0.2 | 8 |
| 0.1 | 9 |
| 0 | 10 |

In Table 2, when the scene grading parameter of the $i^{th}$ audio signal is 0.4, the corresponding priority is 6. In this case, the priority of the $i^{th}$ audio signal is 6. When the scene grading parameter of the $i^{th}$ audio signal is 0.1, the corresponding priority is 9. In this case, the priority of the $i^{th}$ audio signal is 9. It should be noted that Table 2 is an example of the correspondence between the scene grading parameters and the priorities, and does not constitute a limitation on such a correspondence in this application.

In an embodiment, the scene grading parameter of the $i^{th}$ audio signal may be used as the priority of the $i^{th}$ audio signal.

In this application, the priority may not be classified, and the scene grading parameter of the $i^{th}$ audio signal is directly used as the priority of the $i^{th}$ audio signal.

In an embodiment, a range of the scene grading parameter of the $i^{th}$ audio signal may be determined based on a specified range threshold, and a priority corresponding to the range of the scene grading parameter of the $i^{th}$ audio signal is determined as the priority of the $i^{th}$ audio signal.

Based on historical data and/or experience accumulation of audio signal encoding, a priority of an audio signal and a correspondence between a range of a scene grading parameter and each priority may be preset. For example, Table 3 describes another example of the first correspondence between the scene grading parameters and the priorities.

TABLE 3

| Range of a scene grading parameter | Priority |
|---|---|
| [0.9, 1) | 1 |
| [0.8, 0.9) | 2 |
| [0.7, 0.8) | 3 |
| [0.6, 0.7) | 4 |
| [0.5, 0.6) | 5 |

TABLE 3-continued

| Range of a scene grading parameter | Priority |
|---|---|
| [0.4, 0.5) | 6 |
| [0.3, 0.4) | 7 |
| [0.2, 0.3) | 8 |
| [0.1, 0.2) | 9 |
| [0, 0.1) | 10 |

In Table 3, when the scene grading parameter of the $i^{th}$ audio signal is 0.6, the range of the scene grading parameter is [0.6, 0.7), and the corresponding priority is 4. In this case, the priority of the $i^{th}$ audio signal is 4. When the scene grading parameter of the $i^{th}$ audio signal is 0.15, the range of the scene grading parameter is [0.1, 0.2), and the corresponding priority is 9. In this case, the priority of the $i^{th}$ audio signal is 9. It should be noted that Table 3 is an example of the correspondence between the scene grading parameters and the priorities, and does not constitute a limitation on such a correspondence in this application.

Operation 404: Perform bit allocation on the M audio signals based on the M priorities of the M audio signals.

In this application, bit allocation may be performed based on a currently available bit quantity and the M priorities of the M audio signals. A higher quantity of bits are allocated to an audio signal with a higher priority. The currently available bit quantity refers to a total quantity of bits that can be allocated to the M audio signals in the first audio signal set in the current frame before a codec performs bit allocation.

In an embodiment, a bit quantity ratio of the first audio signal may be determined based on the priority of the first audio signal. The first audio signal is any one of the M audio signals. A bit quantity of the first audio signal is obtained based on a product of the currently available bit quantity and the bit quantity ratio of the first audio signal. A correspondence is pre-established between the priority and the bit quantity ratio of the audio signal. One priority may correspond to one bit quantity ratio, or a plurality of priorities may correspond to one bit quantity ratio. A corresponding quantity of bits that can be allocated to the audio signal may be obtained through calculation based on the bit quantity ratio and the currently available bit quantity. For example, M is 3, a priority of a first audio signal is 1, a priority of a second audio signal is 2, and a priority of a third audio signal is 3. It is assumed that a ratio corresponding to the priority 1 is set to 50%, a ratio corresponding to the priority 2 is set to 30%, a ratio corresponding to the priority 3 is set to 20%, and the currently available bit quantity is 100. In this case, a quantity of bits allocated to the first audio signal is 50, a quantity of bits allocated to the second audio signal is 30, and a quantity of bits allocated to the third audio signal is 20. It should be noted that, in different audio frames, a bit quantity corresponding to a priority may be adaptively adjusted. This is not specifically limited.

In an embodiment, the bit quantity corresponding to the priority of the first audio signal may be determined as the bit quantity of the first audio signal based on a specified second correspondence. The second correspondence includes correspondences between a plurality of priorities and a plurality of bit quantities. One or more priorities correspond to one bit quantity. A correspondence is pre-established between the priority and the bit quantity of the audio signal. One priority may correspond to one bit quantity, or a plurality of priorities may correspond to one bit quantity. Based on the correspondence, when the priority of the audio signal is obtained, the corresponding bit quantity may be obtained. For example, M is 3, a priority of a first audio signal is 1, a priority of a second audio signal is 2, and a priority of a third audio signal is 3. It is assumed that a bit quantity corresponding to the priority 1 is set to 50, a bit quantity corresponding to the priority 2 is set to 30, and a bit quantity corresponding to the priority 3 is set to 20.

In an embodiment, when the scene grading parameter of the audio signal does not include the signal grading parameter, and when the scene grading parameter is small, it is considered that a scene grading difference between audio signals is quite small. In this case, bit allocation between the audio signals may be determined based on an absolute energy ratio between the audio signals in an encoding and decoding process. When the scene grading parameter of the audio signal does not include the signal grading parameter, and when the scene grading parameter of the audio signal is large, it is considered that a scene grading difference between audio signals is quite large. In this case, bit allocation between the audio signals may be determined based on the scene grading parameter of the audio signal. In other cases, bit allocation of the audio signal may be determined based on a bit allocation factor of the audio signal. Therefore, the following equations may exist. $sceneRatio_i$ indicates the scene grading parameter of the $i^{th}$ audio signal. bits_available indicates the currently available bit quantity. $bits\_object_i$ indicates the quantity of bits allocated to the $i^{th}$ audio signal.

When $sceneRatio_i \leq \delta$, $bits\_object_i = nrgRatio_i \times bits\_available$, where δ indicates an upper limit of the scene grading parameter, and $nrgRatio_i$ indicates an absolute energy ratio between the $i^{th}$ audio signal and another audio signal.

When $sceneRatio_i \geq \tau$, $bits\_object_i = sceneRatio_i \times bits\_available$, where τ indicates a lower limit of the scene grading parameter.

In addition to the foregoing two cases, $bits\_object_i = objRatio_i \times bits\_available$, where $objRatio_i$ indicates a bit allocation factor of the $i^{th}$ audio signal.

It should be noted that, in addition to the foregoing described method for determining the quantity of bits allocated to the audio signal, another method may be used for implementation. This is not specifically limited in this application.

In this application, a priority of a plurality of audio signals is determined based on a feature of the plurality of audio signals included in the current frame and related information of the audio signals in metadata, and a quantity of bits to be allocated to each audio signal is determined based on the priority, to adapt to a feature of the audio signals. In addition, different audio signals may match different quantities of bits for encoding. This improves encoding and decoding efficiency of the audio signals.

In this application, in operation 402, the M audio signals are determined from the T audio signals of the current frame and added to the first audio signal set. The method in operation 403 and operation 404 is used for the M audio signals. A priority of each audio signal is first determined, and then a quantity of bits allocated to each audio signal is determined based on the priority of the audio signal. When T>M, audio signals in the first audio signal set are not all audio signals in the current frame, and remaining audio signals may be added to a second audio signal set. The second audio signal set includes N audio signals, where N=T−M. For the N audio signals, a simple method may be used to determine a quantity of bits allocated to the N audio signals. For example, a total available bit quantity of the second audio signal set is averaged by N to obtain a bit quantity of each audio signal. In other words, a total quantity of available bits of the second audio signal set are evenly allocated to the N audio signals in the set. It should be noted that another method may alternatively be used to obtain the bit quantity of each audio signal in the second audio signal set. This is not specifically limited in this application.

In addition to the method for determining the priority of the audio signal described in operation 403, this application further provides a priority combination method based on a plurality of priority determining methods, namely, a method for determining a final priority of an audio signal whose priority may be obtained by using a plurality of methods. The following uses the first audio signal as an example for description. The first audio signal is any one of the M audio signals.

In an embodiment, a first parameter set and a second parameter set of the first audio signal are obtained based on the first audio signal and/or metadata corresponding to the first audio signal. The first parameter set includes one or more of the movement grading parameter, the loudness grading parameter, the spread grading parameter, the diffuseness grading parameter, the status grading parameter, the priority grading parameter, and the signal grading parameter in the foregoing related parameters of the first audio signal. The second parameter set also includes one or more of the movement grading parameter, the loudness grading parameter, the spread grading parameter, the diffuseness grading parameter, the status grading parameter, the priority grading parameter, and the signal grading parameter in the foregoing related parameters of the first audio signal. The first parameter set and the second parameter set may include a same parameter, or may include different parameters. A first scene grading parameter of the first audio signal is obtained based on the first parameter set. Herein, refer to the method for determining the scene grading parameter of the M audio signals in the first audio signal set in operation 403, or use another method. A second scene grading parameter of the first audio signal is obtained based on the second parameter set. A method used herein is different from a method for calculating the first scene grading parameter. A scene grading parameter of the first audio signal is obtained based on the first scene grading parameter and the second scene grading parameter. In this application, for the scene grading parameters obtained through calculation by using the two methods for the same audio signal, a weighted averaging method may be used, or a direct averaging method may be used, or a method of obtaining a larger value or a smaller value may be used to determine the final scene grading parameter of the audio signal. This is not specifically limited. In this way, the scene grading parameter of the audio signal may be obtained in diversified manners, and compatible with calculation solutions in various policies.

In an embodiment, after the first scene grading parameter and the second scene grading parameter of the first audio signal are obtained, a first priority of the first audio signal may be obtained based on the first scene grading parameter. In this case, the priority may be obtained by using the method in operation 403, or may be obtained by using another method. A second priority of the first audio signal is obtained based on the second scene grading parameter. A method used herein is different from a method for calculating the first priority. The priority of the first audio signal is obtained based on the first priority and the second priority. In this application, for the priorities obtained through calculation by using the two methods for the same audio signal, a weighted averaging method may be used, or an averaging method may be used, or a method of obtaining a larger value or a smaller value may be used to determine the final priority of the audio signal. This is not specifically limited. In this way, the priority of the audio signal may be obtained in diversified manners, and compatible with calculation solutions in various policies.

In this application, after the quantity of bits allocated to the T audio signals of the current frame is determined by using the method in the foregoing embodiment, a bitstream may be generated based on the quantity of bits of the T audio signals. The bitstream includes T first identifiers, T second identifiers, and T third identifiers. The T audio signals separately correspond to the T first identifiers, the T second identifiers, and the T third identifiers. The first identifier indicates an audio signal set to which a corresponding audio signal belongs. The second identifier indicates a priority of a corresponding audio signal. The third identifier indicates a bit quantity of a corresponding audio signal. The bitstream is sent to a decoding device. After receiving the bitstream, the decoding device performs the foregoing bit allocation method for an audio signal based on the T first identifiers, the T second identifiers, and the T third identifiers that are carried in the bitstream, to determine the bit quantity of the T audio signals. Alternatively, the decoding device may directly determine the audio signal set to which the T audio signals belong, the priority, and the quantity of allocated bits based on the T first identifiers, the T second identifiers, and the T third identifiers that are carried in the bitstream, to decode the bitstream and obtain the T audio signals. The first identifier, the second identifier, and the third identifier are identifier information added on the basis of the method embodiment shown in FIG. 4, so that an encoder side or a decoder side of an audio signal can encode or decode the audio signal based on the same method.

Figure 7:
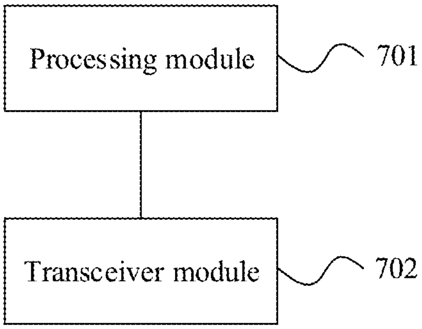
FIG. 7 is a schematic diagram of a structure of an apparatus according to an embodiment.

FIG. 7 is a schematic diagram of a structure of an apparatus according to an embodiment of this application. As shown in FIG. 7, the apparatus may be applied to the encoding device or the decoding device in the foregoing embodiments. The apparatus in this embodiment may include a processing module 701 and a transceiver module 702. The processing module 701 is configured to: obtain T audio signals in a current frame, where T is a positive integer; determine a first audio signal set based on the T audio signals, where the first audio signal set includes M audio signals, M is a positive integer, the T audio signals include the M audio signals, and T≥M; determine M priorities of the M audio signals in the first audio signal set; and perform bit allocation on the M audio signals based on the M priorities of the M audio signals.

In an embodiment, the processing module 701 is configured to: obtain a scene grading parameter of each of the M audio signals; and determine the M priorities of the M audio signals based on the scene grading parameter of each of the M audio signals.

In an embodiment, the processing module 701 is configured to: obtain one or more of a movement grading parameter, a loudness grading parameter, a spread grading parameter, a diffuseness grading parameter, a status grading parameter, a priority grading parameter, and a signal grading parameter of a first audio signal, where the first audio signal is any one of the M audio signals; and obtain a scene grading parameter of the first audio signal based on the obtained one or more of the movement grading parameter, the loudness grading parameter, the spread grading parameter, the diffuseness grading parameter, the status grading parameter, the priority grading parameter, and the signal grading parameter, where the movement grading parameter describes a movement speed of the first audio signal in a unit time in a spatial scene, the loudness grading parameter describes loudness of the first audio signal in the spatial scene, the spread grading parameter describes a spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

In an embodiment, the processing module 701 is configured to obtain S groups of metadata in the current frame, where S is a positive integer, T≥S, the S groups of metadata correspond to the T audio signals, and the metadata describes a status of a corresponding audio signal in the spatial scene.

In an embodiment, the processing module 701 is configured to: obtain one or more of a movement grading parameter, a loudness grading parameter, a spread grading parameter, a diffuseness grading parameter, a status grading parameter, a priority grading parameter, and a signal grading parameter of a first audio signal based on metadata corresponding to the first audio signal or based on the first audio signal and the metadata corresponding to the first audio signal, where the first audio signal is any one of the M audio signals; and obtain a scene grading parameter of the first audio signal based on the obtained one or more of the movement grading parameter, the loudness grading parameter, the spread grading parameter, the diffuseness grading parameter, the status grading parameter, the priority grading parameter, and the signal grading parameter, where the movement grading parameter describes a movement speed of the first audio signal in a unit time in a spatial scene, the loudness grading parameter describes loudness of the first audio signal in the spatial scene, the spread grading parameter describes a spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

In an embodiment, the processing module 701 is configured to: perform weighed averaging on the obtained more of the movement grading parameter, the loudness grading parameter, the spread grading parameter, the diffuseness grading parameter, the status grading parameter, the priority grading parameter, and the signal grading parameter to obtain the scene grading parameter; perform averaging on the obtained more of the movement grading parameter, the loudness grading parameter, the spread grading parameter, the diffuseness grading parameter, the status grading parameter, the priority grading parameter, and the signal grading parameter to obtain the scene grading parameter; or use, as the scene grading parameter, the obtained one of the movement grading parameter, the loudness grading parameter, the spread grading parameter, the diffuseness grading parameter, the status grading parameter, the priority grading parameter, and the signal grading parameter.

In an embodiment, the processing module 701 is configured to: determine a priority corresponding to the scene grading parameter of the first audio signal as a priority of the first audio signal based on a specified first correspondence, where the first correspondence includes correspondences between a plurality of scene grading parameters and a plurality of priorities, one or more scene grading parameters correspond to one priority, and the first audio signal is any one of the M audio signals; use the scene grading parameter of the first audio signal as a priority of the first audio signal; or determine a range of the scene grading parameter of the first audio signal based on a specified range threshold, and determining a priority corresponding to the range of the scene grading parameter of the first audio signal as a priority of the first audio signal.

In an embodiment, the processing module 701 is configured to perform bit allocation based on a currently available bit quantity and the M priorities of the M audio signals, where a higher quantity of bits are allocated to an audio signal with a higher priority.

In an embodiment, the processing module 701 is configured to: determine a bit quantity ratio of the first audio signal based on the priority of the first audio signal, where the first audio signal is any one of the M audio signals; and obtain a bit quantity of the first audio signal based on a product of the currently available bit quantity and the bit quantity ratio of the first audio signal.

In an embodiment, the processing module 701 is configured to determine a bit quantity of the first audio signal from a specified second correspondence based on the priority of the first audio signal, where the second correspondence includes correspondences between a plurality of priorities and a plurality of bit quantities, one or more priorities correspond to one bit quantity, and the first audio signal is any one of the M audio signals.

In an embodiment, the processing module 701 is configured to add a pre-specified audio signal of the T audio signals to the first audio signal set.

In an embodiment, the processing module 701 is configured to: add, to the first audio signal set, an audio signal that is in the T audio signals and that corresponds to the S groups of metadata; or add, to the first audio signal set, an audio signal that corresponds to a priority parameter greater than or equal to a specified participation threshold, where the metadata includes the priority parameter, and the T audio signals include the audio signal that corresponds to the priority parameter.

In an embodiment, the processing module 701 is configured to: obtain one or more of a movement grading parameter, a loudness grading parameter, a spread grading parameter, and a diffuseness grading parameter of a first audio signal, where the first audio signal is any one of the M audio signals; obtain a first scene grading parameter of the first audio signal based on the obtained one or more of the movement grading parameter, the loudness grading parameter, the spread grading parameter, and the diffuseness grading parameter; obtain one or more of a status grading parameter, a priority grading parameter, and a signal grading parameter of the first audio signal; obtain a second scene grading parameter of the first audio signal based on the obtained one or more of the status grading parameter, the priority grading parameter, and the signal grading parameter; and obtain a scene grading parameter of the first audio signal based on the first scene grading parameter and the second scene grading parameter, where the movement grading parameter describes a movement speed of the first audio signal in a unit time in a spatial scene, the loudness grading parameter describes playback loudness of the first audio signal in the spatial scene, the spread grading parameter describes a playback spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

In an embodiment, the processing module 701 is configured to: obtain one or more of a movement grading parameter, a loudness grading parameter, a spread grading parameter, and a diffuseness grading parameter of a first audio signal based on metadata corresponding to the first audio signal or based on the first audio signal and the metadata corresponding to the first audio signal, where the first audio signal is any one of the M audio signals; obtain a first scene grading parameter of the first audio signal based on the obtained one or more of the movement grading parameter, the loudness grading parameter, the spread grading parameter, and the diffuseness grading parameter; obtain one or more of a status grading parameter, a priority grading parameter, and a signal grading parameter of the first audio signal based on the metadata corresponding to the first audio signal or based on the first audio signal and the metadata corresponding to the first audio signal; obtain a second scene grading parameter of the first audio signal based on the obtained one or more of the status grading parameter, the priority grading parameter, and the signal grading parameter; and obtain a scene grading parameter of the first audio signal based on the first scene grading parameter and the second scene grading parameter, where the movement grading parameter describes a movement speed of the first audio signal in a unit time in a spatial scene, the loudness grading parameter describes playback loudness of the first audio signal in the spatial scene, the spread grading parameter describes a playback spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

In an embodiment, the processing module 701 is configured to: obtain a first priority of the first audio signal based on the first scene grading parameter; obtain a second priority of the first audio signal based on the second scene grading parameter; and obtain the priority of the first audio signal based on the first priority and the second priority.

In an embodiment, the processing module 701 is further configured to encode the M audio signals based on a quantity of bits allocated to the M audio signals, to obtain an encoded bitstream.

In an embodiment, the encoded bitstream includes a bit quantity of the M audio signals.

In an embodiment, the apparatus further includes the transceiver module 702, configured to receive the encoded bitstream. The processing module 701 is further configured to obtain a bit quantity of each of the M audio signals and reconstruct the M audio signals based on the bit quantity of each of the M audio signals and the encoded bitstream.

The apparatus in this embodiment may be configured to execute the technical solution of the method embodiment shown in FIG. 4. Implementation principles and technical effects thereof are similar, and details are not described herein again.

Figure 8:
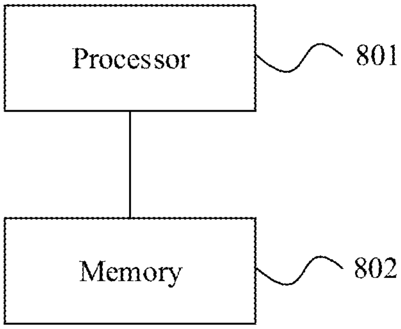
FIG. 8 is a schematic diagram of a structure of a device according to an embodiment.

FIG. 8 is a schematic diagram of a structure of a device according to an embodiment of this application. As shown in FIG. 8, the device may be applied to the encoding device or the decoding device in the foregoing embodiments. The device in this embodiment may include a processor 801 and a memory 802. The memory 802 is configured to store one or more programs. When the one or more programs are executed by the processor 801, the processor 801 is enabled to implement the technical solution of the method embodiment shown in FIG. 4.

In an implementation process, the operations in the foregoing method embodiments can be implemented by a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor, or the like. The operations of the methods disclosed with reference to this application may be directly performed by a hardware encoding processor, or may be performed by a combination of hardware and a software module in an encoding processor. The software module may be located in a storage medium mature in the art, such as a random access memory, a flash memory, a read-only memory, a programmable read-only memory, an electrically erasable programmable memory, or a register. The storage medium is located in the memory. The processor reads information in the memory and completes the operations in the foregoing methods in combination with hardware of the processor.

The memory in the foregoing embodiments may be a volatile memory or a non-volatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes various media that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of bit allocation for an audio signal, comprising:

obtaining T audio signals in a current frame, wherein T is a positive integer;

obtaining S groups of metadata in the current frame, wherein S is a positive integer, T≥S, the S groups of metadata correspond to the T audio signals, and the metadata describes a status of a corresponding audio signal in a spatial scene;

determining a first audio signal set based on the T audio signals, wherein the first audio signal set comprises M audio signals, M is a positive integer, and T≥M;

determining M priorities of the M audio signals in the first audio signal set; and performing bit allocation on the M audio signals based on the M priorities of the M audio signals;

wherein determining the M priorities of the M audio signals in the first audio signal set comprises:

obtaining a scene grading parameter of each of the M audio signals; and determining the M priorities of the M audio signals based on the scene grading parameter of each of the M audio signals.

2. The method according to claim 1, wherein obtaining the scene grading parameter of each of the M audio signals comprises:

obtaining one or more of: a movement grading parameter, a loudness grading parameter, a spread grading parameter, a diffuseness grading parameter, a status grading parameter, a priority grading parameter, or a signal grading parameter of a first audio signal, wherein the first audio signal is one of the M audio signals; and obtaining a scene grading parameter of the first audio signal based on the obtained one or more of: the movement grading parameter, the loudness grading parameter, the spread grading parameter, the diffuseness grading parameter, the status grading parameter, the priority grading parameter, or the signal grading parameter, wherein the movement grading parameter describes a movement speed of the first audio signal in a unit time in a spatial scene, the loudness grading parameter describes loudness of the first audio signal in the spatial scene, the spread grading parameter describes a spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

3. The method according to claim 1, wherein obtaining the scene grading parameter of each of the M audio signals comprises:

obtaining one or more of: a movement grading parameter, a loudness grading parameter, a spread grading parameter, a diffuseness grading parameter, a status grading parameter, a priority grading parameter, or a signal grading parameter of a first audio signal based on metadata corresponding to the first audio signal or based on the first audio signal and the metadata corresponding to the first audio signal, wherein the first audio signal is one of the M audio signals; and obtaining a scene grading parameter of the first audio signal based on the obtained one or more of: the movement grading parameter, the loudness grading parameter, the spread grading parameter, the diffuseness grading parameter, the status grading parameter, the priority grading parameter, or the signal grading parameter, wherein the movement grading parameter describes a movement speed of the first audio signal in a unit time in the spatial scene, the loudness grading parameter describes loudness of the first audio signal in the spatial scene, the spread grading parameter describes a spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

4. The method according to claim 2, wherein obtaining the scene grading parameter of the first audio signal comprises:

performing weighed averaging on the obtained one or more of: the movement grading parameter, the loudness grading parameter, the spread grading parameter, the diffuseness grading parameter, the status grading parameter, the priority grading parameter, or the signal grading parameter, to obtain the scene grading parameter of the first audio signal; or performing averaging on the obtained one or more of: the movement grading parameter, the loudness grading parameter, the spread grading parameter, the diffuseness grading parameter, the status grading parameter, the priority grading parameter, or the signal grading parameter to obtain the scene grading parameter of the first audio signal; or using the obtained one or more of: the movement grading parameter, the loudness grading parameter, the spread grading parameter, the diffuseness grading parameter, the status grading parameter, the priority grading parameter, or the signal grading parameter as the scene grading parameter of the first audio signal.

5. The method according to claim 1, wherein determining the M priorities of the M audio signals based on the scene grading parameter of each of the M audio signals comprises:

determining a priority corresponding to the scene grading parameter of a first audio signal as a priority of the first audio signal based on a specified first correspondence, wherein the specified first correspondence comprises correspondences between a plurality of scene grading parameters and a plurality of priorities, one or more scene grading parameters correspond to a priority, and the first audio signal is one of the M audio signals;

using the scene grading parameter of the first audio signal as a priority of the first audio signal; or determining a range of the scene grading parameter of the first audio signal based on a plurality of specified range thresholds, and determining a priority corresponding to the range of the scene grading parameter of the first audio signal as a priority of the first audio signal.

6. The method according to claim 1, wherein performing the bit allocation on the M audio signals comprises:

performing bit allocation based on a currently available bit quantity and the M priorities of the M audio signals, wherein a higher quantity of bits is allocated to an audio signal with a higher priority.

7. The method according to claim 6, wherein performing the bit allocation based on the currently available bit quantity and the M priorities of the M audio signals comprises:

determining a bit quantity ratio of a first audio signal based on a priority of the first audio signal, wherein the first audio signal is one of the M audio signals; and obtaining a bit quantity of the first audio signal based on a product of the currently available bit quantity and the bit quantity ratio of the first audio signal;

or determining a bit quantity of the first audio signal from a specified second correspondence based on the priority of the first audio signal, wherein the specified second correspondence comprises correspondences between a plurality of priorities and a plurality of bit quantities, one or more priorities correspond to a bit quantity, and the first audio signal is one of the M audio signals.

8. The method according to claim 1, wherein determining the first audio signal set comprises:

adding a pre-specified audio signal of the T audio signals to the first audio signal set.

9. The method according to claim 1, wherein determining the first audio signal set comprises:

adding, to the first audio signal set, an audio signal that is in the T audio signals and corresponds to the S groups of metadata; or adding, to the first audio signal set, an audio signal that corresponds to a priority parameter greater than or equal to a specified participation threshold, wherein the metadata comprises the priority parameter, and the T audio signals comprise the audio signal that corresponds to the priority parameter.

10. The method according to claim 1, wherein obtaining the scene grading parameter of each of the M audio signals comprises:

obtaining one or more of: a movement grading parameter, a loudness grading parameter, a spread grading parameter, or a diffuseness grading parameter of a first audio signal, wherein the first audio signal is one of the M audio signals;

obtaining a first scene grading parameter of the first audio signal based on the obtained one or more of: the movement grading parameter, the loudness grading parameter, the spread grading parameter, or the diffuseness grading parameter;

obtaining one or more of: a status grading parameter, a priority grading parameter, or a signal grading parameter of the first audio signal;

obtaining a second scene grading parameter of the first audio signal based on the obtained one or more of: the status grading parameter, the priority grading parameter, or the signal grading parameter of the first audio signal; and obtaining a scene grading parameter of the first audio signal based on the first scene grading parameter and the second scene grading parameter, wherein the movement grading parameter describes a movement speed of the first audio signal in a unit time in a spatial scene, the loudness grading parameter describes playback loudness of the first audio signal in the spatial scene, the spread grading parameter describes a playback spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

11. The method according to claim 1, wherein obtaining the scene grading parameter of each of the M audio signals comprises:

obtaining one or more of: a movement grading parameter, a loudness grading parameter, a spread grading parameter, or a diffuseness grading parameter of a first audio signal based on metadata corresponding to the first audio signal or based on the first audio signal and the metadata corresponding to the first audio signal, wherein the first audio signal is one of the M audio signals;

obtaining a first scene grading parameter of the first audio signal based on the obtained one or more of: the movement grading parameter, the loudness grading parameter, the spread grading parameter, or the diffuseness grading parameter;

obtaining one or more of: a status grading parameter, a priority grading parameter, or a signal grading parameter of the first audio signal based on the metadata corresponding to the first audio signal or based on the first audio signal and the metadata corresponding to the first audio signal;

obtaining a second scene grading parameter of the first audio signal based on the obtained one or more of: the status grading parameter, the priority grading parameter, or the signal grading parameter of the first audio signal; and obtaining a scene grading parameter of the first audio signal based on the first scene grading parameter and the second scene grading parameter, wherein the movement grading parameter describes a movement speed of the first audio signal in a unit time in the spatial scene, the loudness grading parameter describes playback loudness of the first audio signal in the spatial scene, the spread grading parameter describes a playback spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

12. The method according to claim 10, wherein determining the M priorities of the M audio signals comprises:

obtaining a first priority of the first audio signal based on the first scene grading parameter;

obtaining a second priority of the first audio signal based on the second scene grading parameter; and obtaining the priority of the first audio signal based on the first priority and the second priority.

13. A bit allocation apparatus for an audio signal, comprising:

at least one processor; and one or more memories coupled to the at least one processor and storing programming instructions, which when executed by the at least one processor, cause the apparatus to:

obtain T audio signals in a current frame, wherein T is a positive integer;

obtain S groups of metadata in the current frame, wherein S is a positive integer, T>S, the S groups of metadata correspond to the T audio signals, and the metadata describes a status of a corresponding audio signal in a spatial scene;

determine a first audio signal set based on the T audio signals, wherein the first audio signal set comprises M audio signals, M is a positive integer, and T≥M;

determine M priorities of the M audio signals in the first audio signal set; and perform bit allocation on the M audio signals based on the M priorities of the M audio signals, wherein determining the M priorities of the M audio signals in the first audio signal set comprises:

obtaining a scene grading parameter of each of the M audio signals; and determining the M priorities of the M audio signals based on the scene grading parameter of each of the M audio signals.

14. The apparatus according to claim 13, wherein obtaining the scene grading parameter of each of the M audio signals comprises:

obtaining one or more of: a movement grading parameter, a loudness grading parameter, a spread grading parameter, a diffuseness grading parameter, a status grading parameter, a priority grading parameter, or a signal grading parameter of a first audio signal, wherein the first audio signal is one of the M audio signals; and obtaining a scene grading parameter of the first audio signal based on the obtained one or more of: the movement grading parameter, the loudness grading parameter, the spread grading parameter, the diffuseness grading parameter, the status grading parameter, the priority grading parameter, or the signal grading parameter, wherein the movement grading parameter describes a movement speed of the first audio signal in a unit time in a spatial scene, the loudness grading parameter describes loudness of the first audio signal in the spatial scene, the spread grading parameter describes a spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

15. The apparatus according to claim 13, wherein obtaining the scene grading parameter of each of the M audio signals comprises:

obtaining one or more of: a movement grading parameter, a loudness grading parameter, a spread grading parameter, a diffuseness grading parameter, a status grading parameter, a priority grading parameter, or a signal grading parameter of a first audio signal based on metadata corresponding to the first audio signal or based on the first audio signal and the metadata corresponding to the first audio signal, wherein the first audio signal is one of the M audio signals; and obtaining a scene grading parameter of the first audio signal based on the obtained one or more of: the movement grading parameter, the loudness grading parameter, the spread grading parameter, the diffuseness grading parameter, the status grading parameter, the priority grading parameter, or the signal grading parameter, wherein the movement grading parameter describes a movement speed of the first audio signal in a unit time in the spatial scene, the loudness grading parameter describes loudness of the first audio signal in the spatial scene, the spread grading parameter describes a spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

16. The apparatus according to claim 14, wherein obtaining the scene grading parameter of the first audio signal comprises:

performing weighed averaging on the obtained one or more of: the movement grading parameter, the loudness grading parameter, the spread grading parameter, the diffuseness grading parameter, the status grading parameter, the priority grading parameter, or the signal grading parameter, to obtain the scene grading parameter of the first audio signal; or performing averaging on the obtained one or more of: the movement grading parameter, the loudness grading parameter, the spread grading parameter, the diffuseness grading parameter, the status grading parameter, the priority grading parameter, or the signal grading parameter to obtain the scene grading parameter of the first audio signal; or using the obtained one or more of: the movement grading parameter, the loudness grading parameter, the spread grading parameter, the diffuseness grading parameter, the status grading parameter, the priority grading parameter, or the signal grading parameter as the scene grading parameter of the first audio signal.

17. The apparatus according to claim 13, wherein determining the M priorities of the M audio signals based on the scene grading parameter of each of the M audio signals comprises:

determining a priority corresponding to the scene grading parameter of a first audio signal as a priority of the first audio signal based on a specified first correspondence, wherein the specified first correspondence comprises correspondences between a plurality of scene grading parameters and a plurality of priorities, one or more scene grading parameters correspond to one priority, and the first audio signal is one of the M audio signals;

using the scene grading parameter of the first audio signal as the priority of the first audio signal; or determining a range of the scene grading parameter of the first audio signal based on a plurality of specified range thresholds, and determine a priority corresponding to the range of the scene grading parameter of the first audio signal as a priority of the first audio signal.

18. The apparatus according to claim 13, wherein perform the bit allocation on the M audio signals comprises:

performing bit allocation based on a currently available bit quantity and the M priorities of the M audio signals, wherein a higher quantity of bits is allocated to an audio signal with a higher priority.

19. The apparatus according to claim 18, wherein performing the bit allocation based on the currently available bit quantity and the M priorities of the M audio signals comprises:

determining a bit quantity ratio of a first audio signal based on a priority of the first audio signal, wherein the first audio signal is one of the M audio signals; and obtaining a bit quantity of the first audio signal based on a product of the currently available bit quantity and the bit quantity ratio of the first audio signal;

or determining a bit quantity of the first audio signal from a specified second correspondence based on the priority of the first audio signal, wherein the specified second correspondence comprises correspondences between a plurality of priorities and a plurality of bit quantities, one or more priorities correspond to a bit quantity, and the first audio signal is one of the M audio signals.

20. The apparatus according to claim 13, wherein determining the first audio signal set comprises:

adding a pre-specified audio signal of the T audio signals to the first audio signal set.

21. The apparatus according to claim 13, wherein determining the first audio signal set comprises:

adding, to the first audio signal set, an audio signal that is in the T audio signals and corresponds to the S groups of metadata; or adding, to the first audio signal set, an audio signal that corresponds to a priority parameter greater than or equal to a specified participation threshold, wherein the metadata comprises the priority parameter, and the T audio signals comprise the audio signal that corresponds to the priority parameter.

22. The apparatus according to claim 13, wherein obtaining the scene grading parameter of each of the M audio signals comprises:

obtaining one or more of: a movement grading parameter, a loudness grading parameter, a spread grading parameter, or a diffuseness grading parameter of a first audio signal, wherein the first audio signal is one of the M audio signals;

obtaining a first scene grading parameter of the first audio signal based on the obtained one or more of: the movement grading parameter, the loudness grading parameter, the spread grading parameter, or the diffuseness grading parameter;

obtaining one or more of: a status grading parameter, a priority grading parameter, or a signal grading parameter of the first audio signal;

obtaining a second scene grading parameter of the first audio signal based on the obtained one or more of: the status grading parameter, the priority grading parameter, or the signal grading parameter of the first audio signal; and obtaining a scene grading parameter of the first audio signal based on the first scene grading parameter and the second scene grading parameter, wherein the movement grading parameter describes a movement speed of the first audio signal in a unit time in a spatial scene, the loudness grading parameter describes playback loudness of the first audio signal in the spatial scene, the spread grading parameter describes a playback spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

23. The apparatus according to claim 13, wherein obtaining the scene grading parameter of each of the M audio signals comprises:

obtaining one or more of: a movement grading parameter, a loudness grading parameter, a spread grading parameter, or a diffuseness grading parameter of a first audio signal based on metadata corresponding to the first audio signal or based on the first audio signal and the metadata corresponding to the first audio signal, wherein the first audio signal is one of the M audio signals;

obtaining a first scene grading parameter of the first audio signal based on the obtained one or more of: the movement grading parameter, the loudness grading parameter, the spread grading parameter, or the diffuseness grading parameter;

obtaining one or more of: a status grading parameter, a priority grading parameter, or a signal grading parameter of the first audio signal based on the metadata corresponding to the first audio signal or based on the first audio signal and the metadata corresponding to the first audio signal;

obtaining a second scene grading parameter of the first audio signal based on the obtained one or more of: the status grading parameter, the priority grading parameter, or the signal grading parameter of the first audio signal; and obtaining a scene grading parameter of the first audio signal based on the first scene grading parameter and the second scene grading parameter, wherein the movement grading parameter describes a movement speed of the first audio signal in a unit time in the spatial scene, the loudness grading parameter describes playback loudness of the first audio signal in the spatial scene, the spread grading parameter describes a playback spread range of the first audio signal in the spatial scene, the diffuseness grading parameter describes a diffuseness range of the first audio signal in the spatial scene, the status grading parameter describes sound source divergence of the first audio signal in the spatial scene, the priority grading parameter describes a priority of the first audio signal in the spatial scene, and the signal grading parameter describes energy of the first audio signal in an encoding process.

24. The apparatus according to claim 22, wherein determining the M priorities of the M audio signals comprises:

obtaining a first priority of the first audio signal based on the first scene grading parameter;

obtaining a second priority of the first audio signal based on the second scene grading parameter; and obtaining the priority of the first audio signal based on the first priority and the second priority.

25. A non-transitory computer-readable storage medium storing computer instructions, which when executed by one or more processors, cause the one or more processors to perform operations, the operations comprising:

obtaining T audio signals in a current frame, wherein T is a positive integer;

obtaining S groups of metadata in the current frame, wherein S is a positive integer, T>S, the S groups of metadata correspond to the T audio signals, and the metadata describes a status of a corresponding audio signal in a spatial scene;

determining a first audio signal set based on the T audio signals, wherein the first audio signal set comprises M audio signals, M is a positive integer, and T≥M;

determining M priorities of the M audio signals in the first audio signal set; and performing bit allocation on the M audio signals based on the M priorities of the M audio signals;

wherein determining the M priorities of the M audio signals in the first audio signal set comprises:

obtaining a scene grading parameter of each of the M audio signals; and determining the M priorities of the M audio signals based on the scene grading parameter of each of the M audio signals.

* * * * *